US012676666B2

(12) United States Patent
Liu et al.

(10) Patent No.: US 12,676,666 B2
(45) Date of Patent: Jul. 7, 2026

(54) RESOURCE ALLOCATION FOR AN NTN WITH BEAM HOPPING

(71) Applicant: QUALCOMM Incorporated, San Diego, CA (US)

(72) Inventors: Le Liu, San Jose, CA (US); Alberto Rico Alvarino, San Diego, CA (US); Xiao Feng Wang, San Diego, CA (US); Chiranjib Saha, Lakeside, CA (US)

(73) Assignee: QUALCOMM Incorporated, San Diego, CA (US)

( * ) Notice: Subject to any disclaimer, the term of this patent is extended or adjusted under 35 U.S.C. 154(b) by 490 days.

(21) Appl. No.: 18/495,664

(22) Filed: Oct. 26, 2023

(65) Prior Publication Data
US 2025/0141535 A1    May 1, 2025

(51) Int. Cl.
H04B 7/185      (2006.01)
(52) U.S. Cl.
CPC ................................ H04B 7/18513 (2013.01)
(58) Field of Classification Search
CPC .......................... H04B 7/18513; H04B 7/2041

USPC ............................................................ 370/316
See application file for complete search history.

(56) References Cited

U.S. PATENT DOCUMENTS

| 2023/0262672 A1 * | 8/2023 | Lin ........................ H04L 5/0007 |
| | | 370/329 |
| 2024/0056847 A1 * | 2/2024 | Cheema ................ H04L 5/0094 |
| 2025/0374291 A1 * | 12/2025 | Deogun ............. H04B 7/15528 |

* cited by examiner

*Primary Examiner* — Rownak Islam
(74) *Attorney, Agent, or Firm* — Procopio, Cory, Hargreaves & Savitch LLP

(57) ABSTRACT

A method of wireless communication at a UE is disclosed herein. The method includes receiving, via a satellite and over a first bandwidth and a first beam, at least one of an SSB or a SIB for a cell. The method includes receiving, via the satellite and over a second bandwidth and a second beam, at least one of a CSI-RS or DM-RS for data transmission for a zone within the cell, where the first bandwidth is less than the second bandwidth, and where a first width of the first beam is greater than a second width of the second beam. The method includes communicating via the satellite based on at least one of the SSB, the SIB, the CSI-RS, or the DM-RS.

30 Claims, 18 Drawing Sheets

Example 602 – Satellite Beam Hopping

Figure 8:
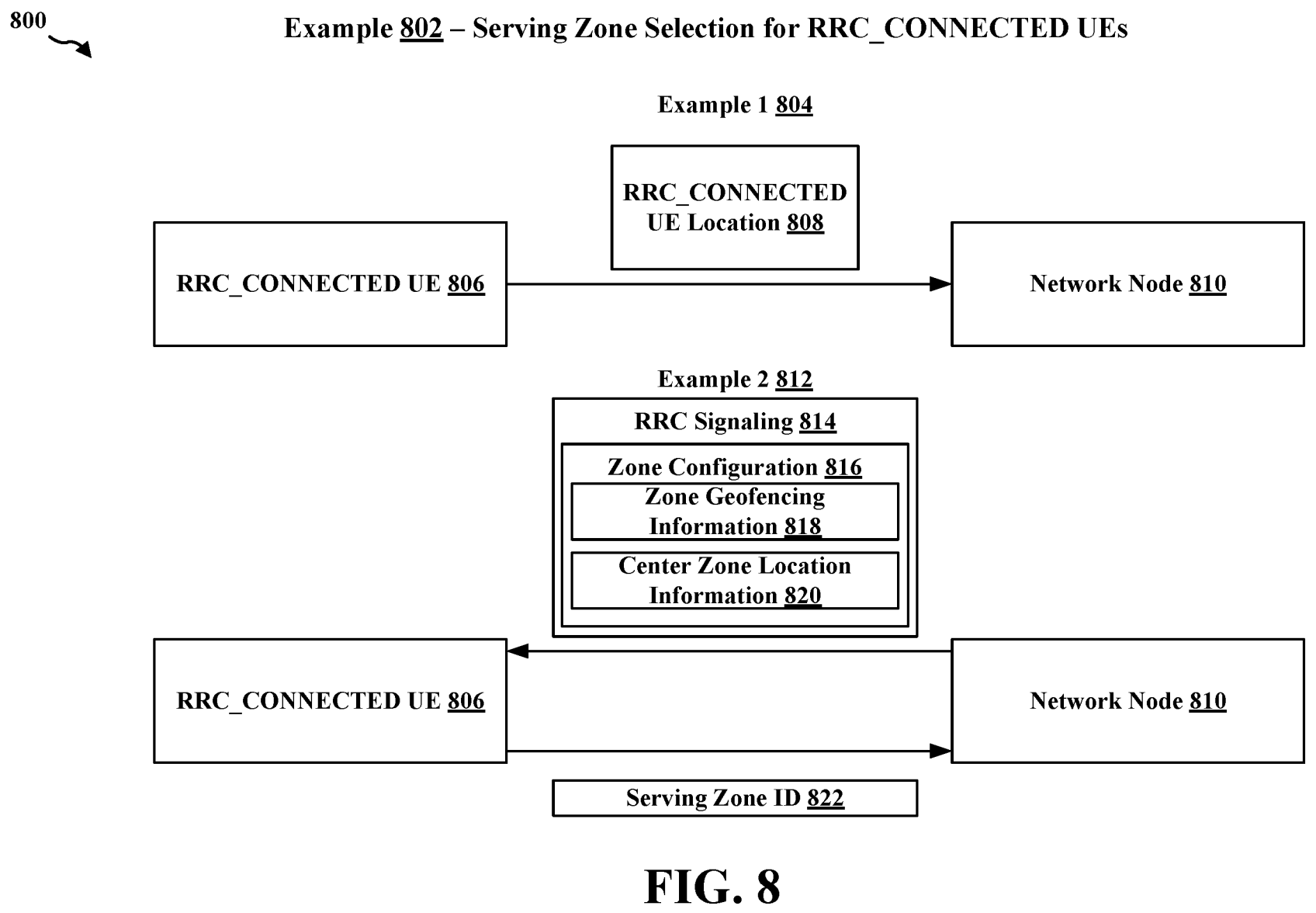

Example 802 – Serving Zone Selection for RRC_CONNECTED UEs

Example 1 804

RRC_CONNECTED UE Location 808

RRC_CONNECTED UE 806

Network Node 810

Example 2 812

RRC Signaling 814

Zone Configuration 816

Zone Geofencing Information 818

Center Zone Location Information 820

RRC_CONNECTED UE 806

Network Node 810

Serving Zone ID 822

Figure 9:
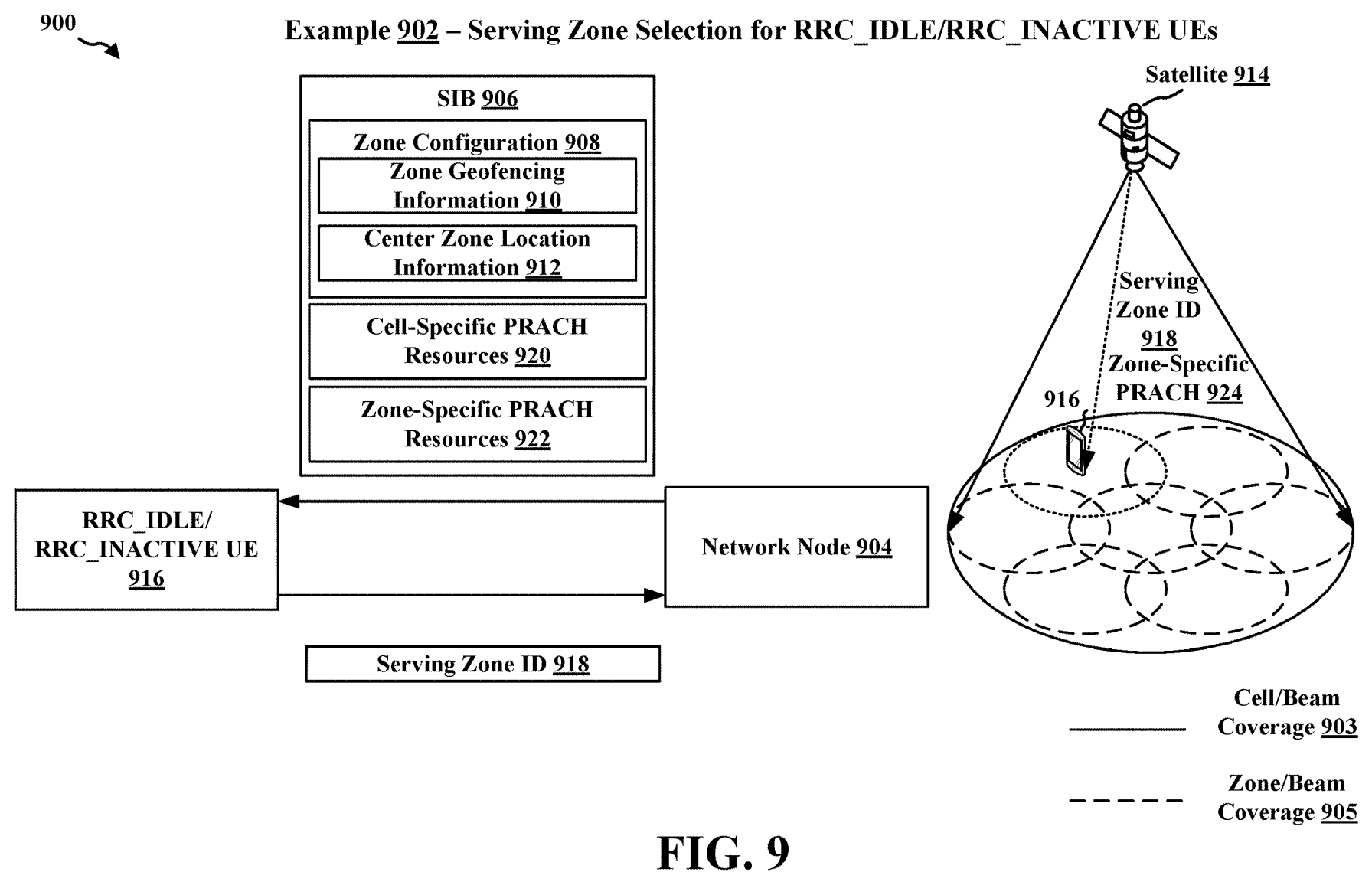

Example 902 – Serving Zone Selection for RRC_IDLE/RRC_INACTIVE UEs

Satellite 914

Serving Zone ID 918 Zone-Specific PRACH 924

916

Cell/Beam Coverage 903

Zone/Beam Coverage 905

Network Node 904

SIB 906

Zone Configuration 908

Zone Geofencing Information 910

Center Zone Location Information 912

Cell-Specific PRACH Resources 920

Zone-Specific PRACH Resources 922

Serving Zone ID 918

RRC_IDLE/ RRC_INACTIVE UE 916

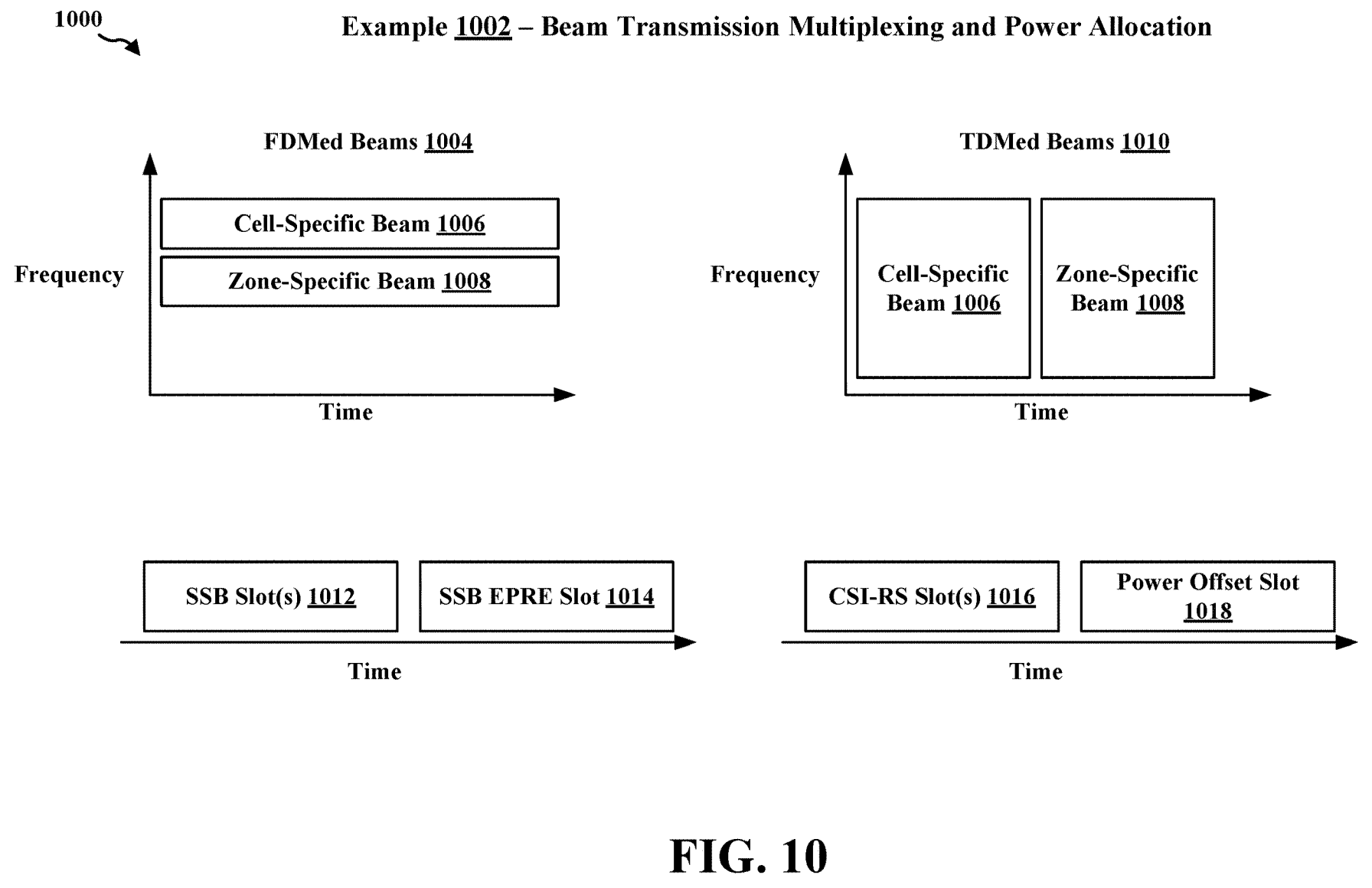

Example 1002 – Beam Transmission Multiplexing and Power Allocation

TDMed Beams 1010

Cell-Specific Beam 1006

Zone-Specific Beam 1008

Frequency

Time

FDMed Beams 1004

Cell-Specific Beam 1006

Zone-Specific Beam 1008

Frequency

Time

Power Offset Slot 1018

CSI-RS Slot(s) 1016

Time

SSB EPRE Slot 1014

SSB Slot(s) 1012

Time

FIG. 10

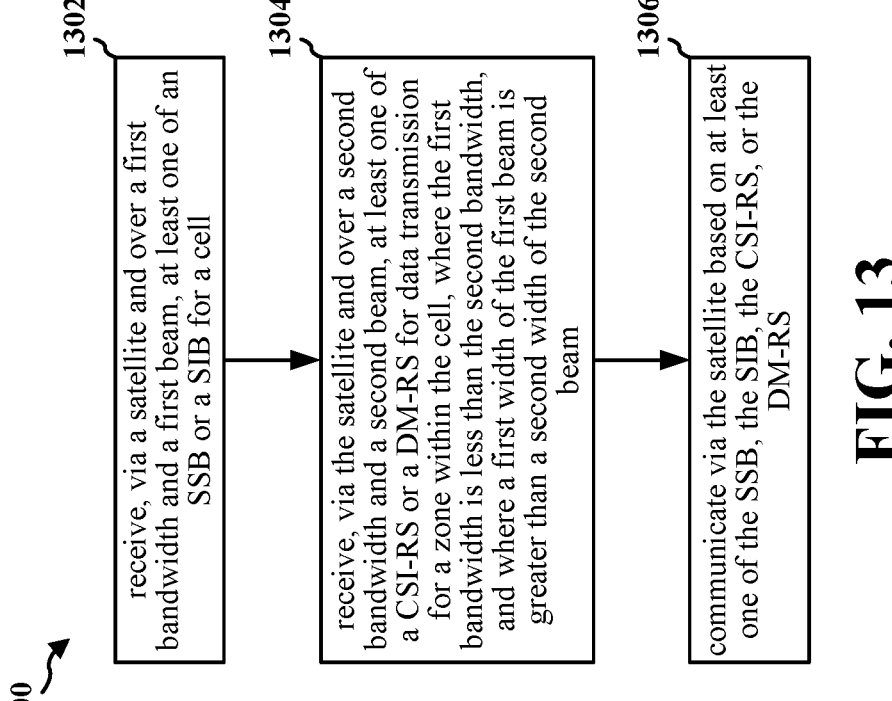

1302 receive, via a satellite and over a first bandwidth and a first beam, at least one of an SSB or a SIB for a cell

1304 receive, via the satellite and over a second bandwidth and a second beam, at least one of a CSI-RS or a DM-RS for data transmission for a zone within the cell, where the first bandwidth is less than the second bandwidth, and where a first width of the first beam is greater than a second width of the second beam

1306 communicate via the satellite based on at least one of the SSB, the SIB, the CSI-RS, or the DM-RS

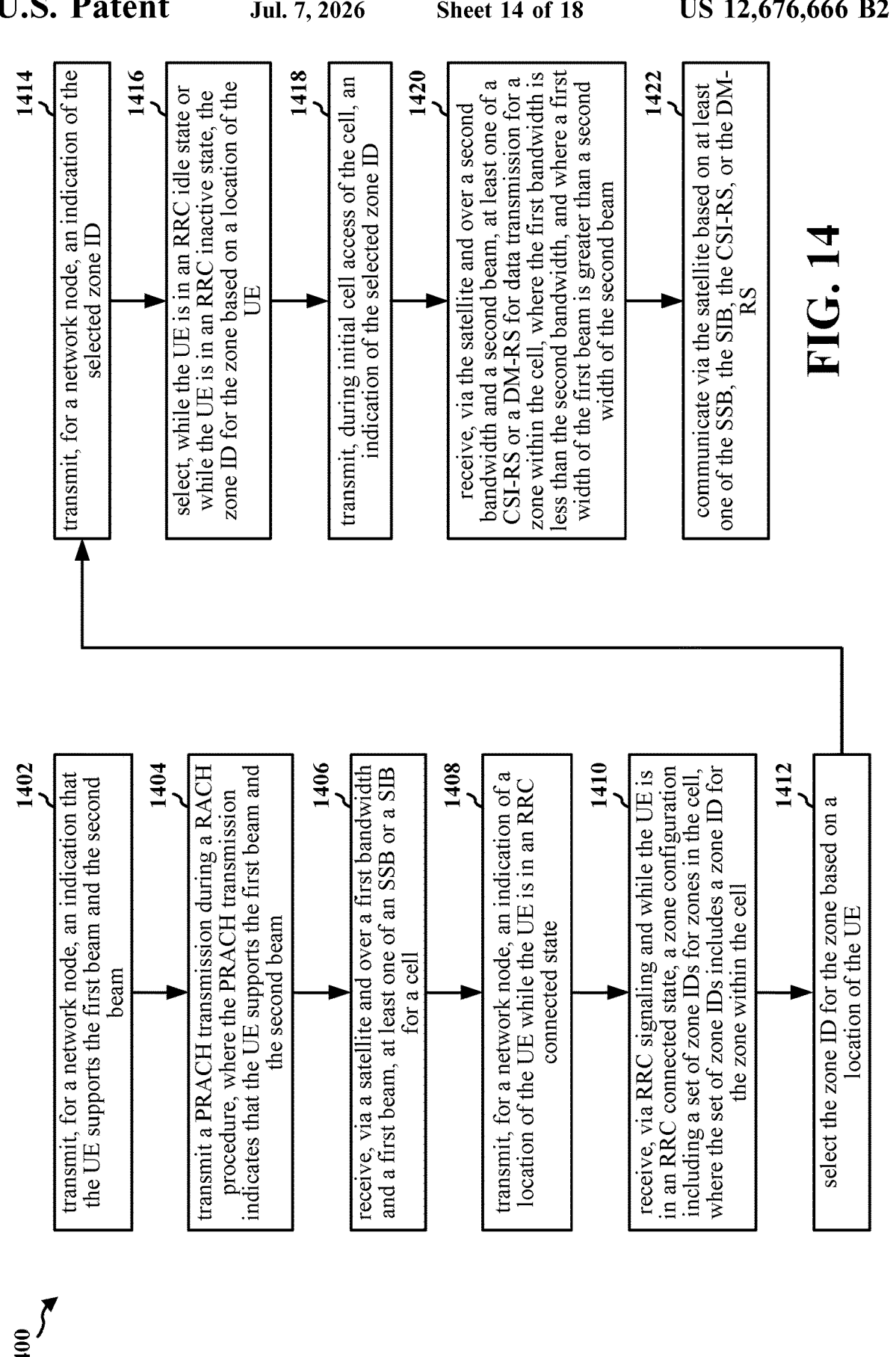

1402 — transmit, for a network node, an indication that the UE supports the first beam and the second beam 1404 — transmit a PRACH transmission during a RACH procedure, where the PRACH transmission indicates that the UE supports the first beam and the second beam 1406 — receive, via a satellite and over a first bandwidth and a first beam, at least one of an SSB or a SIB for a cell 1408 — transmit, for a network node, an indication of a location of the UE while the UE is in an RRC connected state 1410 — receive, via RRC signaling and while the UE is in an RRC connected state, a zone configuration including a set of zone IDs for zones in the cell, where the set of zone IDs includes a zone ID for the zone within the cell 1412 — select the zone ID for the zone based on a location of the UE 1414 — transmit, for a network node, an indication of the selected zone ID 1416 — select, while the UE is in an RRC idle state or while the UE is in an RRC inactive state, the zone ID for the zone based on a location of the UE 1418 — transmit, during initial cell access of the cell, an indication of the selected zone ID 1420 — receive, via the satellite and over a second bandwidth and a second beam, at least one of a CSI-RS or a DM-RS for data transmission for a zone within the cell, where the first bandwidth is less than the second bandwidth, and where a first width of the first beam is greater than a second width of the second beam 1422 — communicate via the satellite based on at least one of the SSB, the SIB, the CSI-RS, or the DM-RS

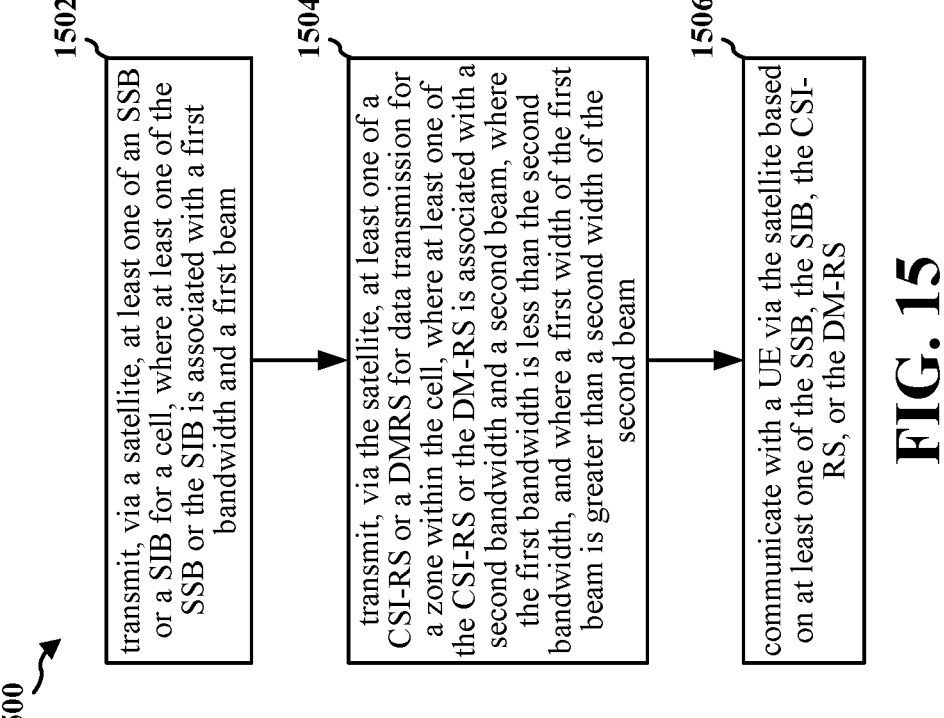

1500

1502 — transmit, via a satellite, at least one of an SSB or a SIB for a cell, where at least one of the SSB or the SIB is associated with a first bandwidth and a first beam 1504 — transmit, via the satellite, at least one of a CSI-RS or a DMRS for data transmission for a zone within the cell, where at least one of the CSI-RS or the DM-RS is associated with a second bandwidth and a second beam, where the first bandwidth is less than the second bandwidth, and where a first width of the first beam is greater than a second width of the second beam 1506 — communicate with a UE via the satellite based on at least one of the SSB, the SIB, the CSI-RS, or the DM-RS

Figure 16:
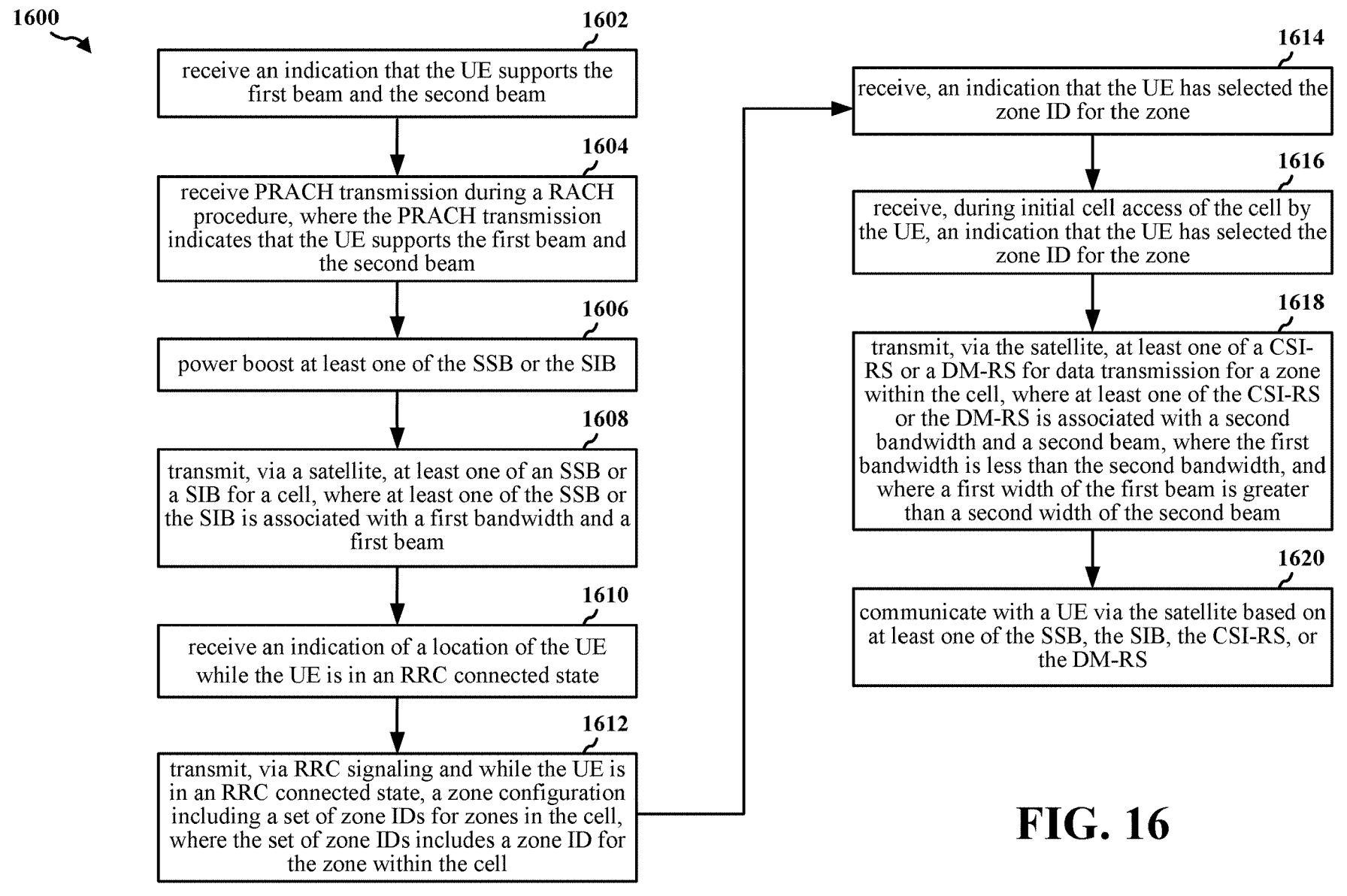

1602 — receive an indication that the UE supports the first beam and the second beam 1604 — receive PRACH transmission during a RACH procedure, where the PRACH transmission indicates that the UE supports the first beam and the second beam 1606 — power boost at least one of the SSB or the SIB 1608 — transmit, via a satellite, at least one of an SSB or a SIB for a cell, where at least one of the SSB or the SIB is associated with a first bandwidth and a first beam 1610 — receive an indication of a location of the UE while the UE is in an RRC connected state 1612 — transmit, via RRC signaling and while the UE is in an RRC connected state, a zone configuration including a set of zone IDs for zones in the cell, where the set of zone IDs includes a zone ID for the zone within the cell 1614 — receive, an indication that the UE has selected the zone ID for the zone 1616 — receive, during initial cell access of the cell by the UE, an indication that the UE has selected the zone ID for the zone 1618 — transmit, via the satellite, at least one of a CSI-RS or a DM-RS for data transmission for a zone within the cell, where at least one of the CSI-RS or the DM-RS is associated with a second bandwidth and a second beam, where the first bandwidth is less than the second bandwidth, and where a first width of the first beam is greater than a second width of the second beam 1620 — communicate with a UE via the satellite based on at least one of the SSB, the SIB, the CSI-RS, or the DM-RS

RESOURCE ALLOCATION FOR AN NTN WITH BEAM HOPPING

TECHNICAL FIELD

The present disclosure relates generally to communication systems, and more particularly, to non-terrestrial networks (NTNs).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus for wireless communication at a user equipment (UE) are provided. The apparatus includes at least one memory; and at least one processor coupled to the at least one memory and, based at least in part on information stored in the at least one memory, the at least one processor, individually or in any combination, is configured to receive, via a satellite and over a first bandwidth and a first beam, at least one of a synchronization signal block (SSB) or a system information block (SIB) for a cell; receive, via the satellite and over a second bandwidth and a second beam, at least one of a channel-state information reference signal (CSI-RS) or a demodulation reference signal (DM-RS) for data transmission for a zone within the cell, where the first bandwidth is less than the second bandwidth, and where a first width of the first beam is greater than a second width of the second beam; and communicate via the satellite based on at least one of the SSB, the SIB, the CSI-RS, or the DM-RS.

In an aspect of the disclosure, a method, a computer-readable medium, and an apparatus for wireless communication at a network node are provided. The apparatus includes at least one memory; and at least one processor coupled to the at least one memory and, based at least in part on information stored in the at least one memory, the at least one processor, individually or in any combination, is configured to transmit, via a satellite, at least one of a synchronization signal block (SSB) or a system information block (SIB) for a cell, where at least one of the SSB or the SIB is associated with a first bandwidth and a first beam; transmit, via the satellite, at least one of a channel-state information reference signal (CSI-RS) or a demodulation reference signal (DM-RS) for data transmission for a zone within the cell, where at least one of the CSI-RS or the DM-RS is associated with a second bandwidth and a second beam, where the first bandwidth is less than the second bandwidth, and where a first width of the first beam is greater than a second width of the second beam; and communicate with a user equipment (UE) via the satellite based on at least one of the SSB, the SIB, the CSI-RS, or the DM-RS.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 8 is a diagram illustrating an example of serving zone selection for radio resource control (RRC) connected UEs.

FIG. 9 is a diagram illustrating an example of serving zone selection for RRC idle or RRC inactive UEs.

FIG. 10 is a diagram illustrating an example of beam transmission multiplexing and power boosting.

FIG. 13 is a flowchart of a method of wireless communication.

FIG. 14 is a flowchart of a method of wireless communication.

FIG. 15 is a flowchart of a method of wireless communication.

FIG. 16 is a flowchart of a method of wireless communication.

DETAILED DESCRIPTION

Figure 1:
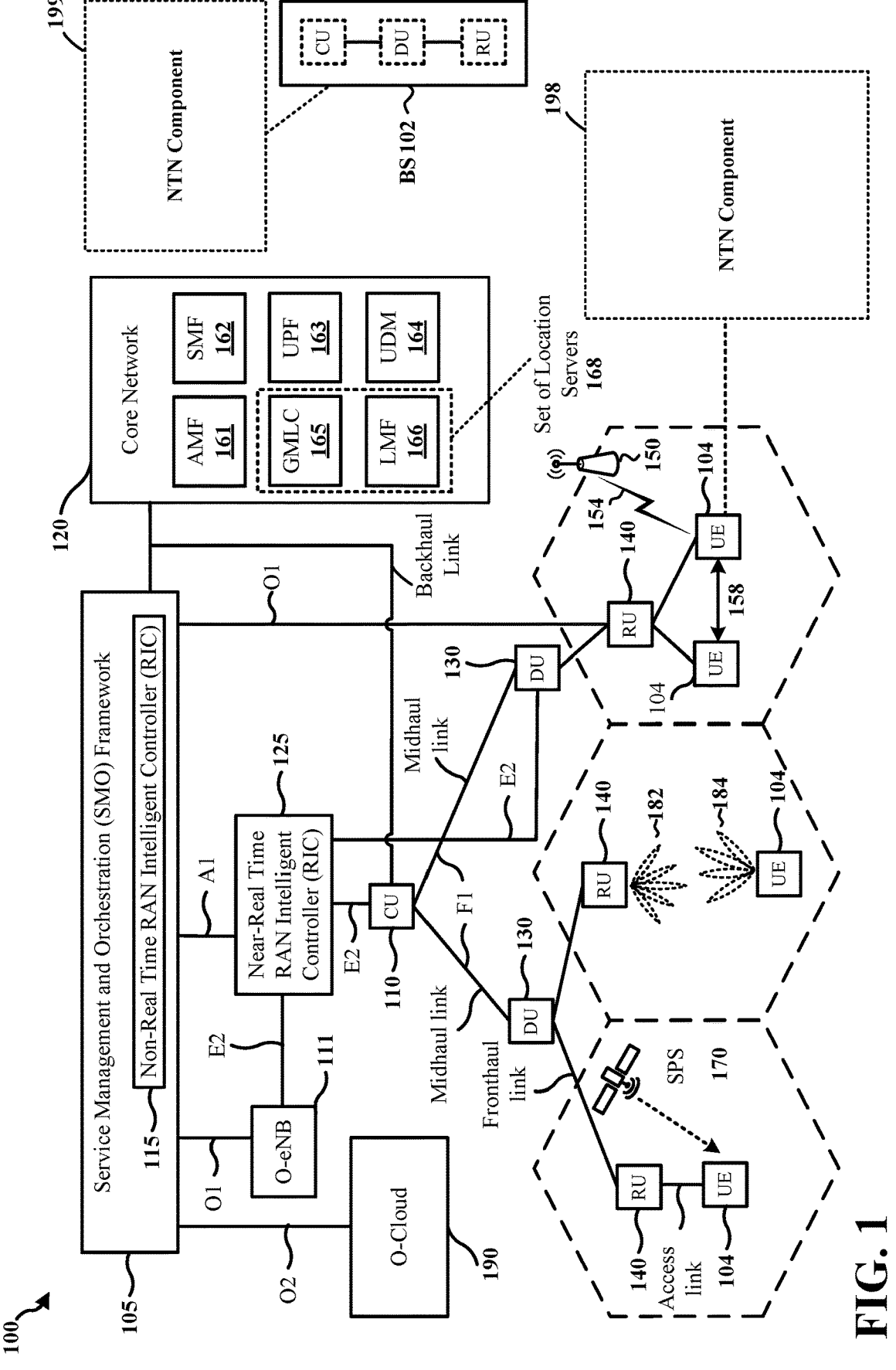
FIG. 1 is a diagram illustrating an example of a wireless communications system and an access network.

A non-terrestrial network (NTN) may refer to a wireless communication system that utilizes satellites in order to provide wireless communication services to UEs. In an example, a UE may transmit first data and/or first signal(s) to a satellite via a service link and the satellite may relay the first data and/or the first signal(s) to a network node (e.g., a base station) via a feeder link. In another example, the network node may transmit second data and/or second signal(s) to the satellite via the feeder link and the satellite may relay the second data and/or the second signal(s) to the UE via the service link.

In a 5G NR NTN, a satellite may divide a service area into sub-areas (i.e., cells) and serve each of the sub-areas with individual beams, where each of the individual beams may correspond to one cell. In order to avoid inter-cell beam interference, the satellite may apply different frequency bands (frequency reuse factor>1) to neighboring cells. However, if frequency bands are reused, subbands allocated per cell/SSB beam may have limited spectrum resources for data transmission.

Beam hopping may refer to a satellite communication technology that increases network capacity by using different beams in a time division multiplexing (TDM) manner. In an example with respect to beam hopping, each cell may have a cell-specific beam for initial access and data. Data for cells/beams that are located relatively far away from one another may be transmitted in the same time slot and may use a whole bandwidth, whereas data for adjacent cells/beams may be transmitted in different time slots. A beam hopping time pattern may determine a cell dwell time within a cluster of cells. However, if beam hopping is utilized, a time allocated per cell beam may have limited time resources both for initial cell access and data transmission. Thus, both frequency reuse and beam hopping may have limited resource utilization and/or may not be able to support flexible resource allocation based on whether or not a UE is present in a coverage area.

Various technologies pertaining to resource allocation for an NTN with beam hopping are described herein. In an example, a UE receives, via a satellite and over a first bandwidth and a first beam, at least one of a synchronization signal block (SSB) or a system information block (SIB) for a cell. The UE receives, via the satellite and over a second bandwidth and a second beam, at least one of a channel-state information reference signal (CSI-RS) or a demodulation reference signal (DM-RS) for data transmission for a zone within the cell, where the first bandwidth is less than the second bandwidth, and where a first width of the first beam is greater than a second width of the second beam. The UE communicates via the satellite based on at least one of the SSB, the SIB, the CSI-RS, or the DM-RS. Vis-à-vis receiving at least one of the SSB and/or the SIB for the cell via the satellite and receiving at least one of the CSI-RS or the DM-RS for the zone within the cell, the UE may improve utilization of time and frequency resources. Furthermore, the SSB and/or the SIB and the CSI-RS and/or the DM-RS may facilitate flexible resource allocation based on whether or not a UE is present in a coverage area.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. When multiple processors are implemented, the multiple processors may perform the functions individually or in combination. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EE-PROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUS 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via 01) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth™ (Bluetooth is a trademark of the Bluetooth Special Interest Group (SIG)), Wi-Fi™ (Wi-Fi is a trademark of the Wi-Fi Alliance) based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHZ) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHZ-71 GHz), FR4 (71 GHz-114.25 GHZ), and FR5 (114.25 GHZ-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL- TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/ actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may have an NTN component 198 that may be configured to receive, via a satellite and over a first bandwidth and a first beam, at least one of a synchronization signal block (SSB) or a system information block (SIB) for a cell; receive, via the satellite and over a second bandwidth and a second beam, at least one of a channel-state information reference signal (CSI-RS) or a demodulation reference signal (DM-RS) for data transmission for a zone within the cell, where the first bandwidth is less than the second bandwidth, and where a first width of the first beam is greater than a second width of the second beam; and communicate via the satellite based on at least one of the SSB, the SIB, the CSI-RS, or the DM-RS. In certain aspects, the base station 102 may have an NTN component 199 that may be configured to transmit, via a satellite, at least one of a synchronization signal block (SSB) or a system information block (SIB) for a cell, where at least one of the SSB or the SIB is associated with a first bandwidth and a first beam; transmit, via the satellite, at least one of a channel-state information reference signal (CSI-RS) or a demodulation reference signal (DM-RS) for data transmission for a zone within the cell, where at least one of the CSI-RS or the DM-RS is associated with a second bandwidth and a second beam, where the first bandwidth is less than the second bandwidth, and where a first width of the first beam is greater than a second width of the second beam; and communicate with a user equipment (UE) via the satellite based on at least one of the SSB, the SIB, the CSI-RS, or the DM-RS. Although the following description may be focused on 5G NR, the concepts presented herein may also be applicable to other wireless communication systems as well.

Figures 2A, 2B, 2C, 2D:
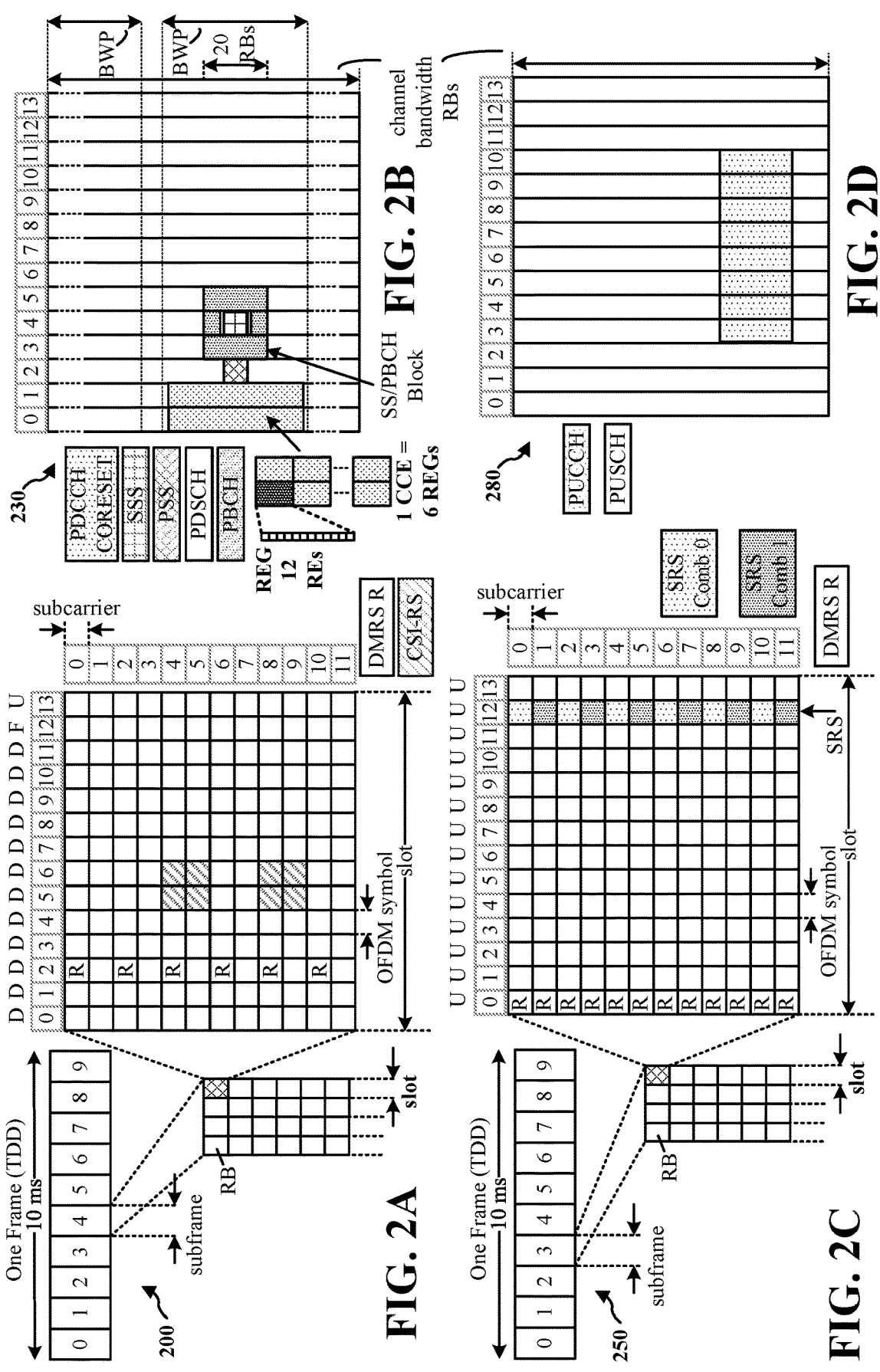
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

| Numerology, SCS, and CP | | |
| --- | --- | --- |
| $\mu$ | SCS $\Delta f = 2^{\mu} \cdot 15[kHz]$ | Cyclic prefix |
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^{\mu}$ slots/subframe. The subcarrier spacing may be equal to $2^{\mu}*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
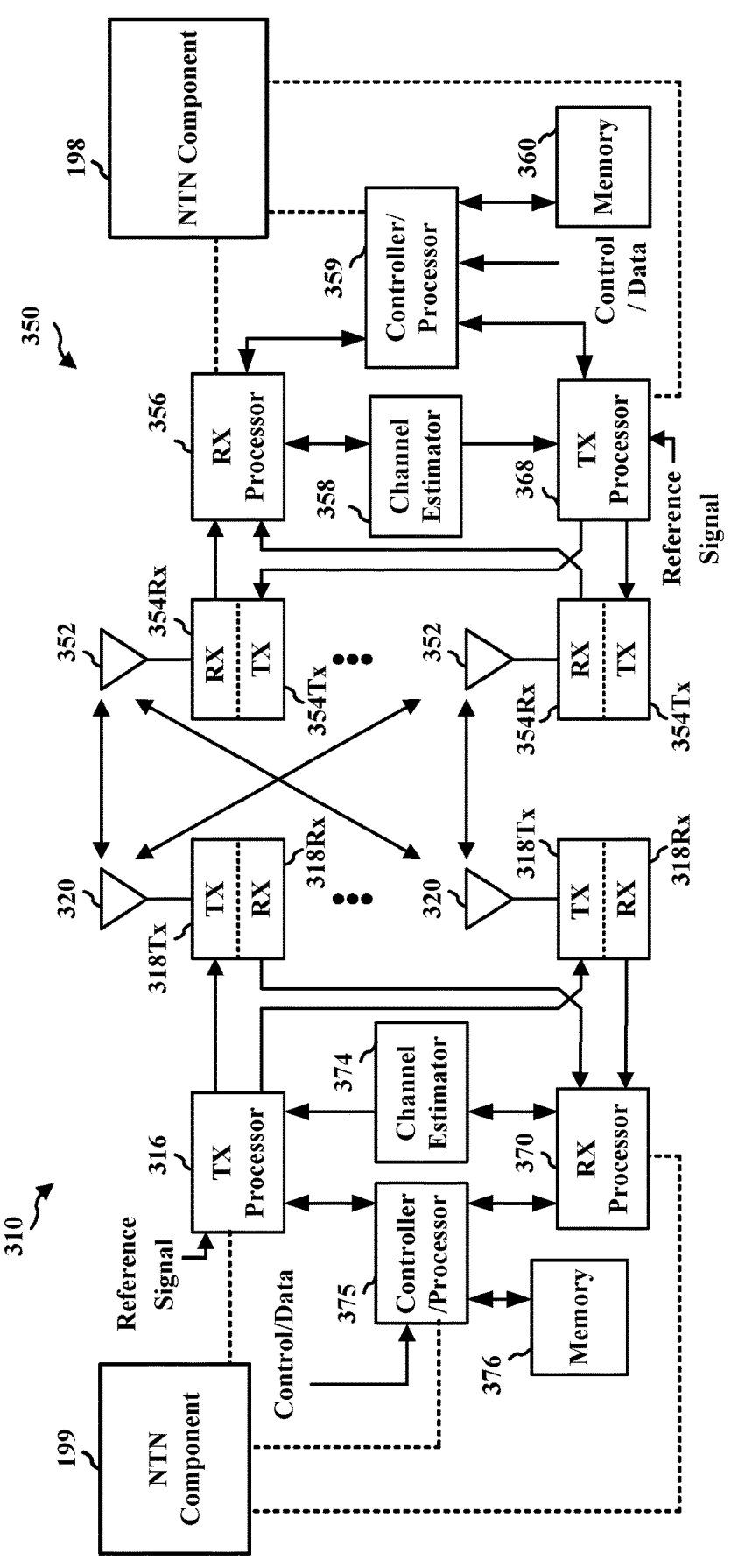
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with at least one memory 360 that stores program codes and data. The at least one memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with at least one memory 376 that stores program codes and data. The at least one memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the NTN component 198 of FIG. 1.

At least one of the TX processor 316, the RX processor 370, and the controller/processor 375 may be configured to perform aspects in connection with the NTN component 199 of FIG. 1.

A non-terrestrial network (NTN) may refer to a wireless communication system that utilizes satellites in order to provide wireless communication services to UEs. In an example, a UE may transmit first data and/or first signal(s) to a satellite via a service link and the satellite may relay the first data and/or the first signal(s) to a network node (e.g., a base station) via a feeder link. In another example, the network node may transmit second data and/or second signal(s) to the satellite via the feeder link and the satellite may relay the second data and/or the second signal(s) to the UE via the service link.

Figures 4A, 4B, 4C:
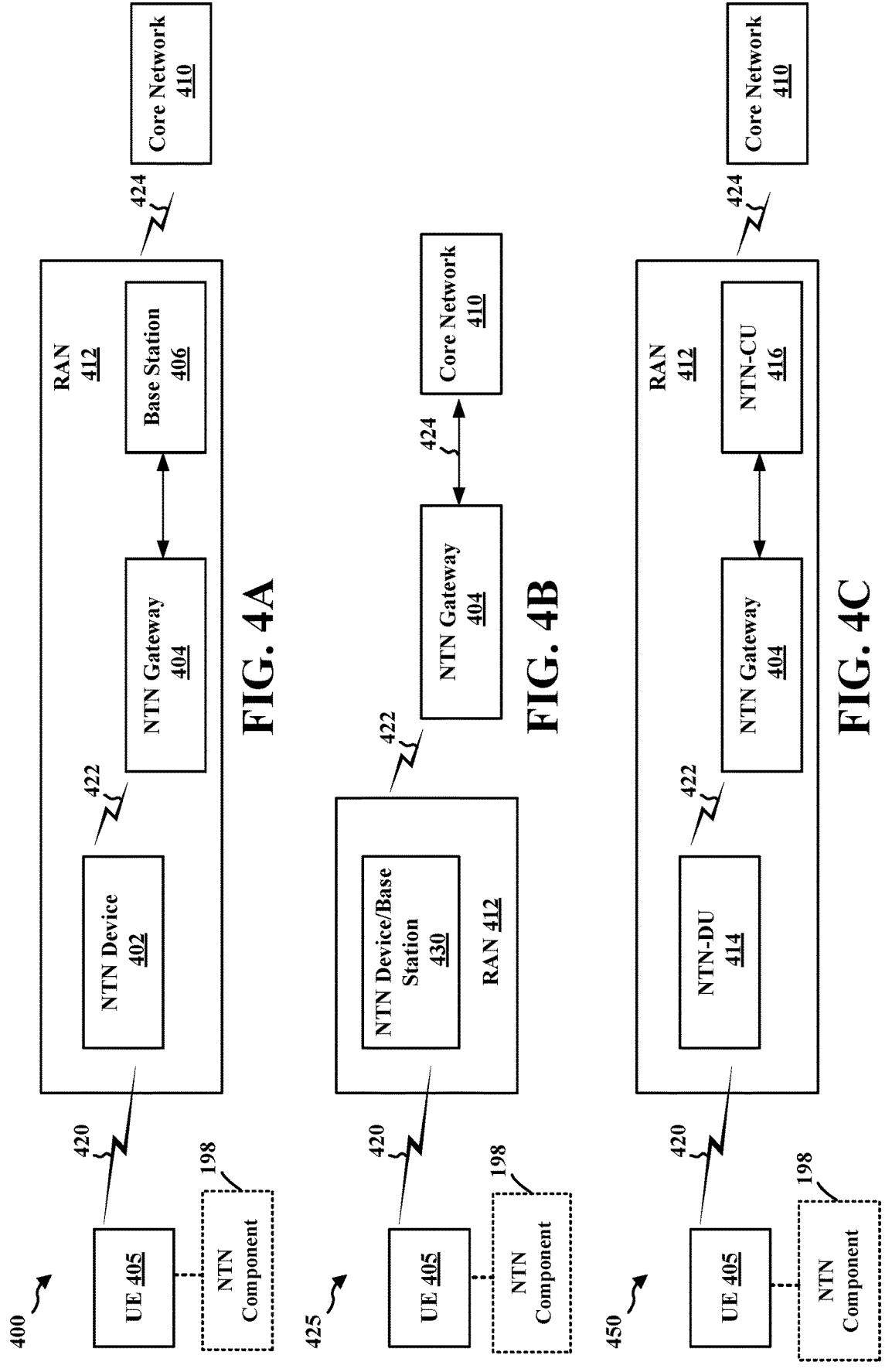
FIG. 4A, FIG. 4B, and FIG. 4C are diagrams illustrating example network architectures capable of supporting NTN access.

FIGS. 4A-4C illustrate example aspects of various network architecture examples capable of supporting NTN access. FIG. 4A illustrates a network architecture with transparent payloads. The network architecture 400 of FIG. 4A includes a UE 405, an NTN device 402 (which may also be referred to as a satellite, an aerial device, or a space vehicle, among other examples), an NTN gateway 404 (sometimes referred to as "gateway," "earth station," or "ground station"), and a base station 406 (which may also be referred to as a network node or network entity) having the capability to communicate with the UE 405 via the NTN device 402. The base station 406 may be a network node or network entity of a terrestrial communication network, for example. A network node may include a base station in aggregation or may correspond to one or more disaggregated components of a base station, such as a CU, DU, and/or RU. The NTN device 402, the NTN gateway 404, and the base station 406 may be part of a RAN 412. As one example, the NTN device 402, the base station 406, and the NTN gateway 404 may be part of an NG RAN, or a RAN for other communication technologies, such as 3G, 4G LTE, 6G, etc. The network architecture 400 is illustrated as further including a core network 410, which may correspond to the core network 120 described in connection with FIG. 1. A core network 410 may be a public land mobile network (PLMN), for example. Connections in the network architecture 400 with transparent payloads illustrated in FIG. 4A, allow the base station 406 to access the NTN gateway 404 and the core network 410. In some examples, the base station 406 may be shared by multiple PLMNs. Similarly, the NTN gateway 404 may be shared by more than one base station. Although the examples of FIG. 4A, FIG. 4B, and FIG. 4C illustrate one UE 405, many UEs may utilize the network architecture 400. Similarly, the network architecture 400 may include a larger (or smaller) number of NTN devices, NTN gateways, base stations, RAN, core networks, and/or other components. The illustrated connections that connect the various components in the network architecture 400 include data and signaling connections which may include additional (intermediary) components, direct or indirect physical and/or wireless connections, and/or additional networks. Furthermore, components may be rearranged, combined, separated, substituted, and/or omitted, depending on desired functionality.

The UE 405 may be configured to communicate with the core network 410 via the NTN device 402, the NTN gateway 404, and the base station 406. As illustrated by the RAN 412, one or more RANs associated with the core network 410 may include one or more base stations. Access to the network may be provided to the UE 405 via wireless communication between the UE 405 and the base station 406 (e.g., a serving base station), via the NTN device 402 and the NTN gateway 404.

The base station 406 may be referred to by other names such as a network node, a network entity, a gNB, a "satellite node", a satellite NodeB (sNB), "satellite access node", etc. The base station 406 in FIG. 4A may be different than a terrestrial network base station, in some aspects, such as supporting additional capability beyond that of a terrestrial base station. For example, the base station 406 may terminate the radio interface and associated radio interface protocols to the UE 405 and may transmit DL signals to the UE 405 and receive UL signals from the UE 405 via the NTN device 402 and the NTN gateway 404. The base station 406 may also support signaling connections and voice and data bearers to the UE 405 and may support handover of the UE 405 between different radio cells for the NTN device 402, between different NTN devices and/or between different base stations. The base station 406 may be configured to manage moving radio beams (e.g., for airborne vehicles and/or non-geostationary (non-GEO) devices) and associated mobility of the UE 405. The base station 406 may assist in the handover (or transfer) of the NTN device 402 between different NTN gateways or different base stations. Additionally, a coverage area of the base station 406 may be much larger than the coverage area of a terrestrial network base station. In some examples, the base station 406 may be separate from the NTN gateway 404, e.g., as illustrated in the example of FIG. 4A. In other examples, the base station 406 may include or may be combined with one or more NTN gateways, e.g., using a split architecture. For example, with a split architecture, the base station 406 may include a CU, such as the example CU 110 of FIG. 1, and the NTN gateway 404 may include or act as (DU, such as the example DU 130 of FIG. 1. The base station 406 may be fixed on the ground for transparent payload operation. In one implementation, the base station 406 may be physically combined with, or physically connected to, the NTN gateway 404 to reduce complexity and cost.

The NTN gateway 404 may be shared by more than one base station and may communicate with the UE 405 via the NTN device 402. The NTN gateway 404 may be dedicated to one associated constellation of NTN devices. The NTN gateway 404 may be included within the base station 406, e.g., as a base station-DU within the base station 406.

In the illustrated example of FIG. 4A, a service link 420 may facilitate communication between the UE 405 and the NTN device 402, a feeder link 422 may facilitate communication between the NTN device 402 and the NTN gateway 404, and an interface 424 may facilitate communication between the base station 406 and the core network 410. The service link 420 and the feeder link 422 may be implemented by a same radio interface (e.g., a Uu interface).

FIG. 4B shows a diagram of a network architecture 425 capable of supporting NTN access similar to FIG. 4A, but having a network architecture for regenerative payloads, as opposed to transparent payloads shown in FIG. 4A. A regenerative payload, unlike a transparent payload, includes an on-board base station (e.g., includes the functional capability of a base station), and is referred to herein as an NTN device/base station 430. The on-board base station may be a network node that corresponds to the network device (e.g., 102 or 310 FIG. 1 or FIG. 3). The RAN 412 is illustrated as including the NTN device/base station 430 for communication with the UE 405 and the core network 410.

An on-board base station may perform many of the same functions as the base station 406, as described previously. For example, the NTN device/base station 430 may terminate the radio interface and associated radio interface protocols to the UE 405 and may transmit DL signals to the UE 405 and receive UL signals from the UE 405, which may include encoding and modulation of transmitted signals and demodulation and decoding of received signals. The NTN device/base station 430 may communicate with one or more NTN gateways and with one or more core networks via the NTN gateway 404. In some aspects, the NTN device/base station 430 may communicate directly with other NTN device/base stations using Inter-Satellite Links (ISLs), which may support an Xn interface between any pair of NTN device/base stations.

With low Earth orbit (LEO) devices, the NTN device/base station 430 may manage moving radio cells with coverage at different times. The NTN gateway 404 may be connected directly to the core network 410, as illustrated. The NTN gateway 404 may be shared by multiple core networks, for example, if NTN gateways are limited. In some examples the core network 410 may be aware of coverage area(s) of the NTN device/base station 430 in order to page the UE 405 and to manage handover.

FIG. 4C shows a diagram of a network architecture 450 similar to that shown in FIGS. 4A and 4B, that supports regenerative payloads, as opposed to transparent payloads, as shown in FIG. 4A, and with a split architecture for the base station. For example, the base station may be split between a CU (e.g., such as CU 110 of FIG. 1), and a DU (e.g., such as the DU 130 of FIG. 1). In the illustrated example of FIG. 4C, the network architecture 450 includes an NTN-CU 416, which may be a component of a ground-based base station or a terrestrial base station. The regenerative payloads include an on-board base station DU, and is referred to herein as an NTN-DU 414. The NTN-CU 416 and the NTN-DU 414, collectively or individually, may correspond to the network node associated with the network device (e.g., base station 310) in FIG. 3.

The NTN-DU 414 communicates with the NTN-CU 416 via the NTN gateway 404. The NTN-CU 416 together with the NTN-DU 414 perform functions, and may use internal communication protocols, e.g., based on a split architecture. The NTN-CU 416 and the NTN-DU 414 may each support additional capabilities to provide the UE 405 access using NTN devices.

The NTN-DU 414 and the NTN-CU 416 may communicate with one another using an F1 Application Protocol (F1AP), and together may perform some or all of the same functions as the base station 406 or the NTN device/base station 430 as described in connection with FIGS. 4B and 4C, respectively.

The NTN-DU 414 may terminate the radio interface and associated lower level radio interface protocols to the UE 405 and may transmit DL signals to the UE 405 and receive UL signals from the UE 405, which may include encoding and modulation of transmitted signals and demodulation and decoding of received signals. The operation of the NTN-DU 414 may be partly controlled by the NTN-CU 416. The NTN-DU 414 may support one or more radio cells for the UE 405. The NTN-CU 416 may also be split into separate control plane (CP) (NTN-CU-CP) and user plane (UP) (NTN-CU-UP) portions. The NTN-DU 414 and the NTN-CU 416 may communicate over an F1 interface to (a) support control plane signaling for the UE 405 using IP, Stream Control Transmission Protocol (SCTP) and F1 Application Protocol (F1AP) protocols, and (b) to support user plane data transfer for a UE 405 using IP, User Datagram Protocol (UDP), PDCP, SDAP, GTP-U and NR User Plane Protocol (NRUPP) protocols.

The NTN-CU 416 may communicate with one or more other NTN-CUs and/or with one more other terrestrial base stations using terrestrial links to support an Xn interface between any pair of NTN-CUs and/or between the NTN-CU 416 and a terrestrial base station.

In an NTN, such as a 5G NR NTN, a satellite may divide a service area into sub-areas (i.e., cells) and serve each of the sub-areas with individual beams, where each of the individual beams may correspond to one cell. In order to avoid inter-cell beam interference, the satellite may apply different frequency bands (frequency reuse factor>1) to neighboring cells. However, if frequency bands are reused, subbands allocated per cell/SSB beam may have limited spectrum resources for data transmission.

Beam hopping may refer to a satellite communication technology that increases network capacity by using different beams in a time division multiplexing (TDM) manner. In an example with respect to beam hopping, each cell may have a cell-specific beam that is provided, or designated, for initial access and data. Data for cells/beams that are located relatively far away from one another may be transmitted in the same time slot and may use a whole bandwidth (e.g., system bandwidth of a communication system), whereas data for adjacent cells/beams may be transmitted in different time slots. A beam hopping time pattern may be the basis of a cell dwell time within a cluster of cells. However, if beam hopping is utilized, a time allocated per cell beam (e.g., the beam designated for initial access and data for the cell) may have limited time resources both for initial cell access and data transmission. Thus, both frequency reuse and beam hopping may lead to limited resource utilization and/or may not be able to support flexible resource allocation based on whether or not a UE is present in a coverage area.

Various technologies pertaining to resource allocation for an NTN with beam hopping are described herein. In an example, a UE receives, via a satellite and over a first bandwidth and a first beam, at least one of a synchronization signal block (SSB) or a system information block (SIB) for a cell. The UE receives, via the satellite and over a second bandwidth and a second beam, at least one of a channel-state information reference signal (CSI-RS) or a demodulation reference signal (DM-RS) for data transmission for a zone within the cell, where the first bandwidth is less than the second bandwidth, and where a first width of the first beam is greater than a second width of the second beam. For example, a zone may refer to a sub-area within a cell, such that a coverage are for the cell spans multiple zones. The UE communicates via the satellite based on at least one of the SSB, the SIB, the CSI-RS, or the DM-RS. Vis-à-vis receiving at least one of the SSB and/or the SIB for the cell via the satellite and receiving at least one of the CSI-RS or the DM-RS for the zone within the cell, the UE may improve utilization of time and frequency resources. Furthermore, the SSB and/or the SIB and the CSI-RS and/or the DM-RS may facilitate flexible resource allocation based on whether or not a UE is present in a coverage area.

Some NTNs may reuse frequencies across zones. Other NTNs may use beam hopping across zones. Various technologies pertaining to beam-related resource allocations for an NTN with beam hopping are described herein.

Figure 5:
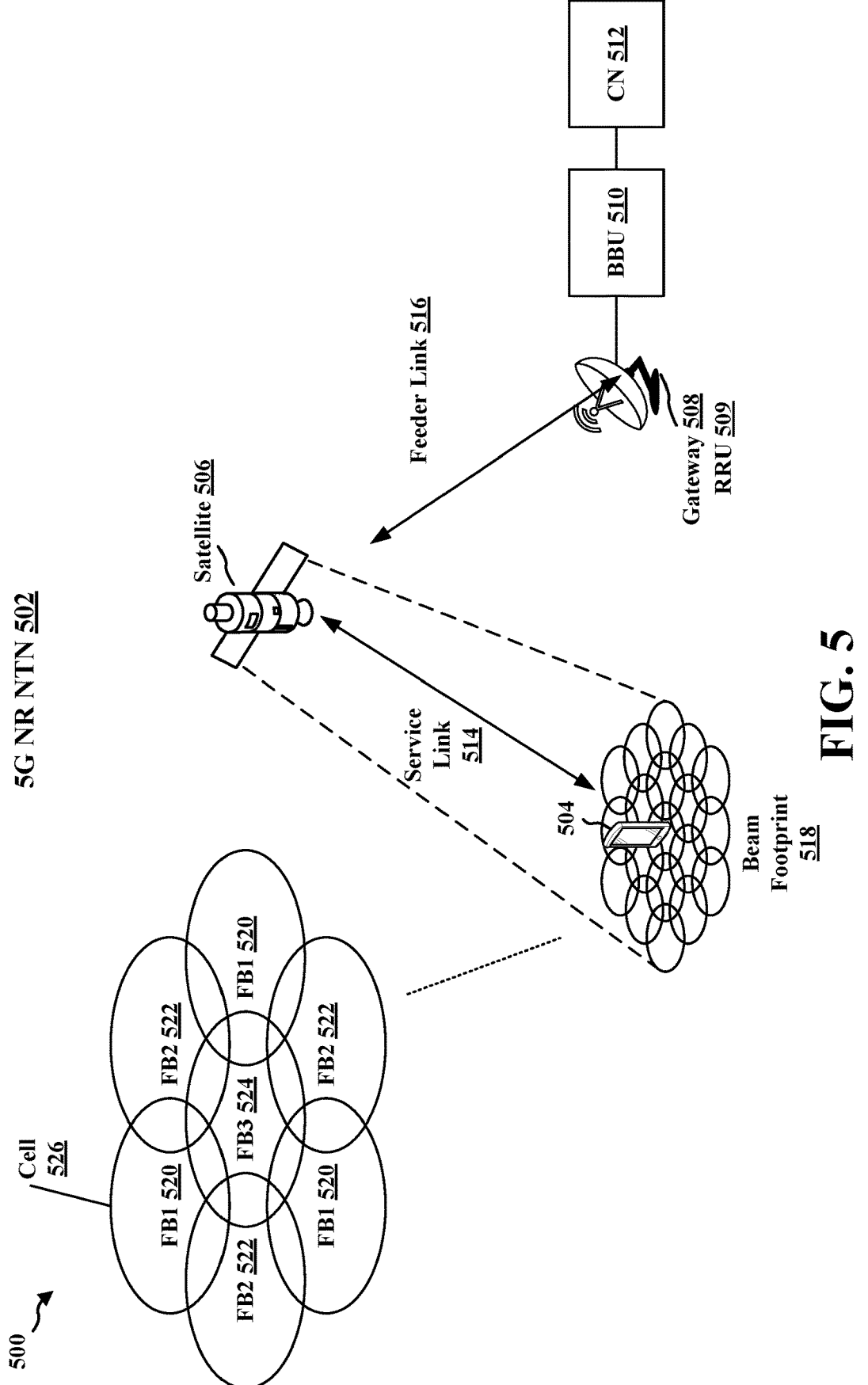
FIG. 5 is a diagram illustrating an example of a 5G NR non-terrestrial network (NTN).

FIG. 5 is a diagram 500 illustrating an example of a 5G NR non-terrestrial network (NTN) 502. Although example aspects are described for a 5G NR NTN, the aspects presented herein may also be used in connection with other wireless communication technologies, such as 3G, 4G LTE, or 6G, among others. The 5G NR NTN 502 may support a single-hop transparent payload. The 5G NR NTN 502 may include a UE 504, a satellite 506, a gateway 508, a remote radio unit (RRU) 509, a baseband unit (BBU) 510, and a core network (CN) 512. In an example, the UE 504 may be or include the UE 104 or the UE 350. In an example, the satellite 506 may be or include a low earth orbit (LEO) satellite, a medium earth orbit (MEO) satellite, a geostationary earth orbit (GEO) satellite, or a high elliptical orbit (HEO) satellite, or an unmanned artificial system (UAS) (e.g., a high altitude platform station (HAPS)). The satellite 506 and the UE 504 may exchange (e.g., transmit and/or receive) data/signal(s) via a service link 514 (i.e., a service access link). The satellite 506 and the gateway and RRU 509 may exchange (e.g., transmit and/or receive) data/signal(s) via a feeder link 516. The CN 512 may be or include the core network 120.

The satellite 506 may support a single-hop transparent payload scenario. In such a scenario, the satellite 506 may act as a relay (e.g., as a remote radio unit) between the UE and the gateway 508. For instance, the satellite 506 may be capable of analog digital beamforming with antenna arrays and frequency band conversion between the feeder link 516 and the service link 514 for a forward and return link. In contrast, in a regenerative satellite based scenario, a satellite may act as a base station or as part of a base station.

In an example, the satellite 506 may divide a service area into a number of sub-areas, where each sub-area is served via the satellite 506 by an individual beam and where each sub-area corresponds to one cell. In an example, the satellite 506 may divide a service area into several hundred sub-areas. The service area may correspond to a beam footprint 518. As illustrated in the diagram 500, the UE 504 may be located in a sub-area (i.e., a cell) within the beam footprint 518.

In order to avoid inter-cell/beam interference, the satellite 506 may apply different frequency bands to neighbor cells (i.e., to different sub-areas). In an example, the satellite 506 may apply the different frequency bands with a frequency reuse factor>1. In the example illustrated in the diagram 500, the satellite 506 may apply (1) a first frequency band (FB1) 520 to first cells in the beam footprint 518, (2) a second frequency band (FB2) 522 to second cells in the beam footprint 518, and (3) a third frequency band (FB3) 524 to third cells in the beam footprint 518. In an example, the satellite 506 may apply FB1 520, FB2 522, and FB3 524 to cells such that neighboring cells of a cell have different frequency bands applied compared to a frequency band of the cell. In an example, FB1 520 may be applied to a cell 526, whereas FB2 522 and FB3 524 may be applied to neighbor cells of the cell 526. When a frequency band is applied to a cell, a UE may communicate (via the satellite 506) over the frequency band in order to exchange data and/or signals.

Figure 6:
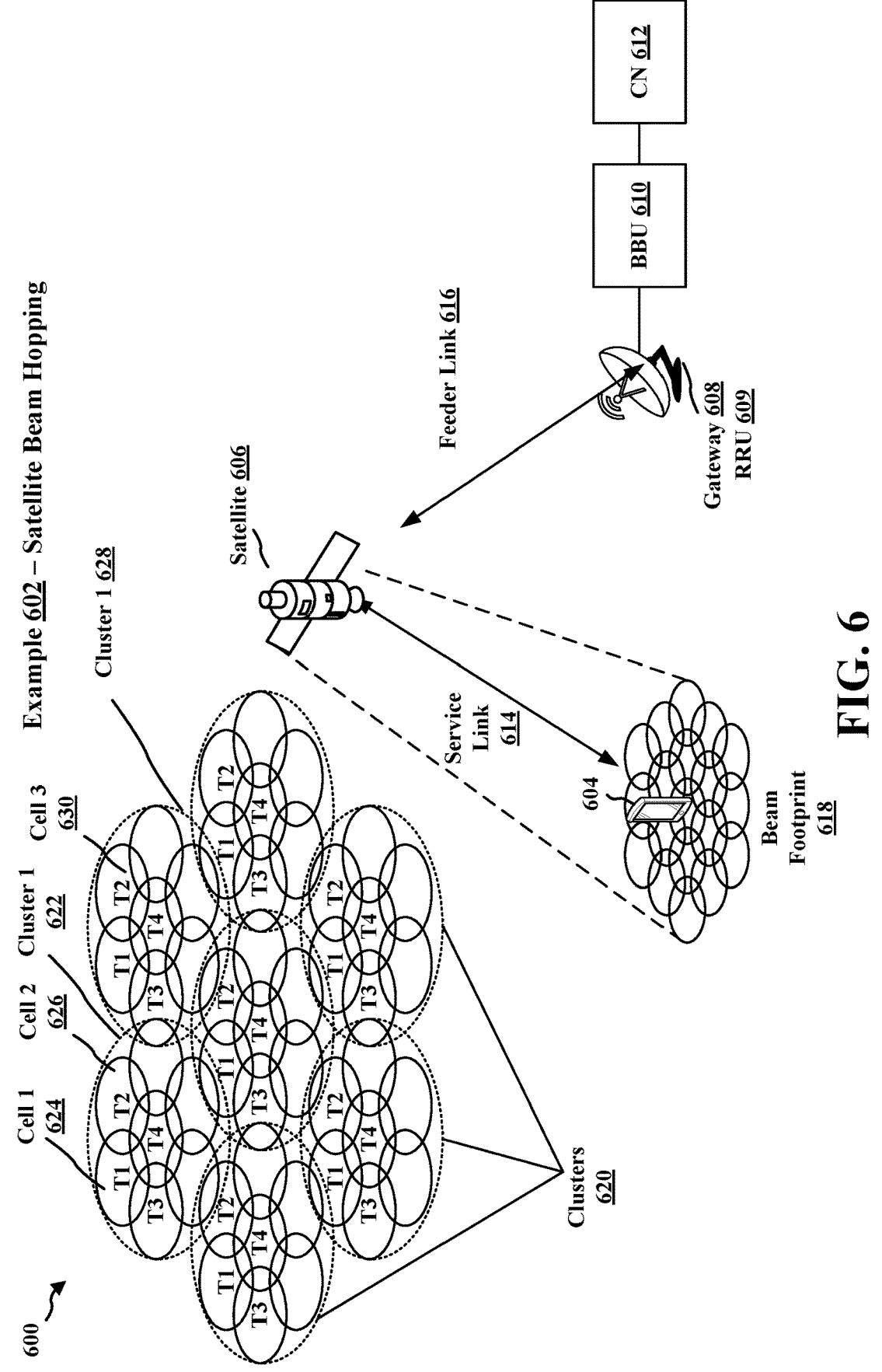
FIG. 6 is a diagram illustrating an example of satellite beam hopping.

FIG. 6 is a diagram 600 illustrating an example 602 of satellite beam hopping. Beam hopping (i.e., satellite beam hopping) may refer to a satellite communication technology that increases network capacity by using different beams in a time division multiplexing (TDM) manner. For example, the satellite may transmit communication using a first directional beam at a first time, and at a second time, the satellite may change to transmit communication using a second directional beam that is different than the first directional beam. The change from the first beam to the second beam may be referred to as "hopping" to the second beam. Although described for transmission, the satellite may similarly change between beams, or hop between different beams, when monitoring for, or receiving, communication from UEs.

An NTN may include a UE 604, a satellite 606, a gateway 608, a remote radio unit (RRU) 609, a baseband unit (BBU) 610, and a core network (CN) 612. In an example, the UE 604 may be or include the UE 104 or the UE 350. In an example, the satellite 606 may be or include a low earth orbit (LEO) satellite, a medium earth orbit (MEO) satellite, a geostationary earth orbit (GEO) satellite, or a high elliptical orbit (HEO) satellite, or an unmanned artificial system (UAS) (e.g., a high altitude platform station (HAPS)). The satellite 606 and the UE 604 may exchange (e.g., transmit and/or receive) data/signal(s) via a service link 614 (i.e., a service access link). The satellite 606 and the gateway and RRU 609 may exchange (e.g., transmit and/or receive) data/signal(s) via a feeder link 616. The CN 612 may be or include the core network 120.

In an example, the satellite 606 may divide a service area into a number of sub-areas, where each sub-area is served via the satellite 606 by an individual beam and where each sub-area corresponds to one cell. In an example, the satellite 606 may divide a service area into several hundred sub-areas. The service area may correspond to a beam footprint 618. As illustrated in the diagram 600, the UE 604 may be located in a sub-area (i.e., a cell) within the beam footprint 618.

Beam hopping may be supported by defining several super-framing specifications. For example, each cell in the beam footprint 618 may have a cell-specific beam for initial access and data. For cells/beams that are located relatively far away from each other, data/signal(s) may be transmitted in the same time slot and may use a whole bandwidth, whereas for cells/beams that are located adjacent to one another, data/signal(s) may be transmitted in different time slots. Beam hopping may be associated with the Digital Video Broadcasting-Satellite Second Generation Extension (DVB-S2X) standard. The DVB-S2X standard may refer to a satellite digital broadcasting standard. The DVB-S2X standard may support beam hopping by defining several super-framing specifications.

Beam hopping time patterns may determine a cell dwell time and a beam hopping cycle within a cluster that includes multiple cells. A beam hopping cycle may refer to an order in which beams are transmitted for different cells within a cluster. A cell dwell time may refer to an amount of time that a satellite transmits and/or receives data/signal(s) associated with a cell before switching to another cell. In an example, the satellite 606 may divide the beam footprint 618 into clusters 620, where each cluster in the clusters 620 may include multiple cells. In an example, the clusters 620 may include a first cluster 622 that includes a first cell 624 and a second cell 626 and a second cluster 628 that includes a third cell 630. In an example, the first cell 624 and the third cell 630 may be non-adjacent to one another. As such, the satellite 606 may transmit/relay data/signal(s)/beams for the first cell 624 and data/signal(s)/beams for the third cell 630 in the same time slots (e.g., in first time slots (T1)). In another example, the first cell 624 and the second cell 626 may be adjacent to one another. As such, the satellite 606 may transmit/relay data/signal(s)/beams for the first cell 624 in T1 and the satellite 606 may transmit/relay data/signal(s)/beams for the second cell 626 in second time slots (T2).

For an NTN that employs frequency reuse (e.g., the 5G NR NTN 502), a subband allocated per cell (i.e., per SSB beam) may have limited spectrum resources for data transmission. However, for an NTN that employs beam hopping (e.g., the NTN in the example 602), a time allocated per cell beam may have limited time resources for both initial access and data transmission. Thus, both frequency reuse and beam hopping may be associated with limited resource utilization (e.g., limited time resource utilization, limited frequency resource utilization). Furthermore, both frequency reuse and beam hopping may not be able to support a flexible resource allocation based on whether or not UEs are present in a cell.

Figure 7:
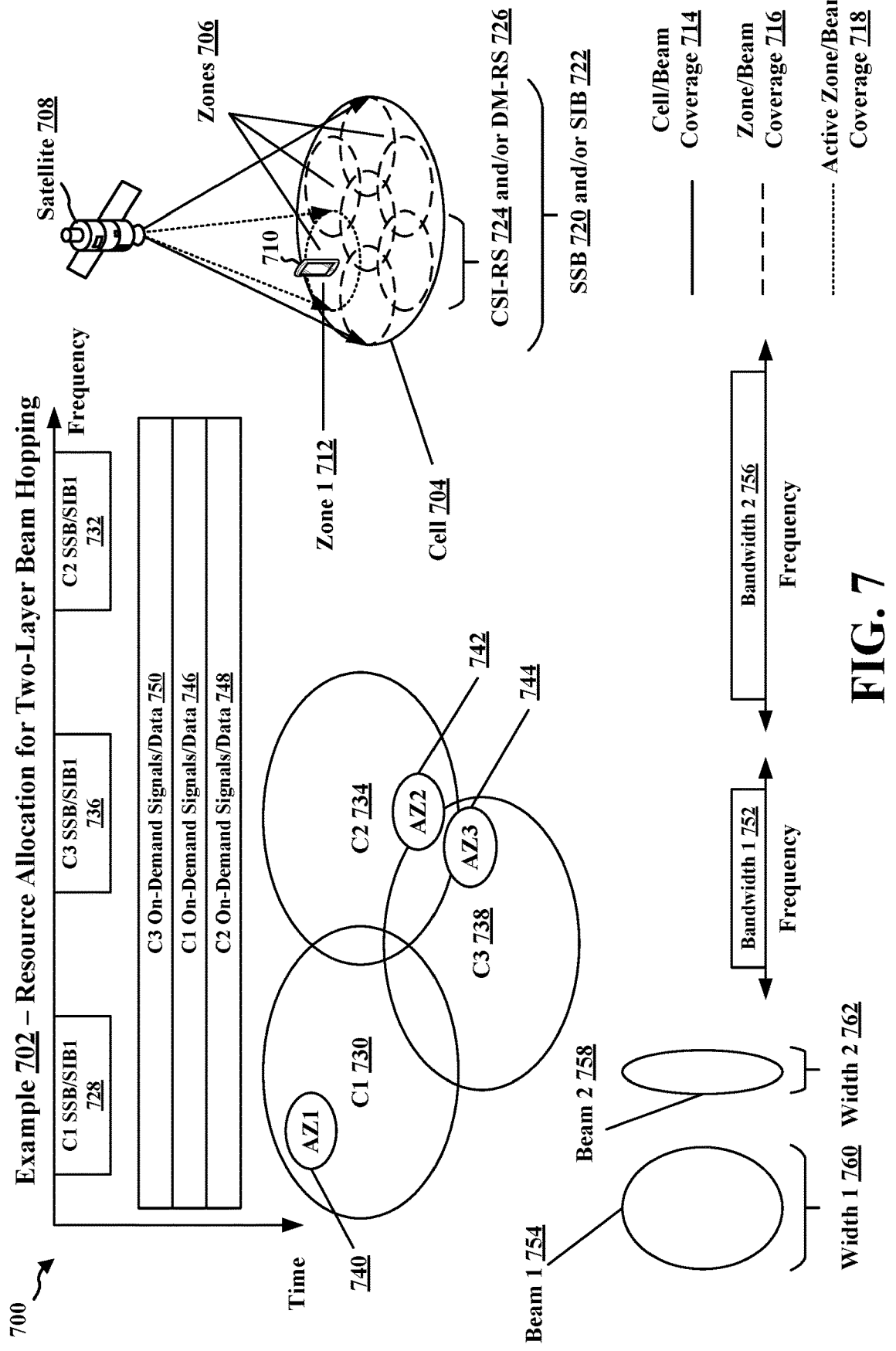
FIG. 7 is a diagram illustrating an example of resource allocation for two-layer beam hopping.

FIG. 7 is a diagram 700 illustrating an example 702 of resource allocation for two-layer beam hopping. In an example, a cell 704 may be divided into zones 706, where the zones 706 may correspond to a beam footprint of a satellite 708 (e.g., the satellite 506, the satellite 606), and where each of the zones 706 is associated with a smaller area than an area of the cell 704. In an example, the satellite 708 may be part of an NTN, such as the 5G NR NTN 502. In an example, a UE 710 may be located in a first zone 712 in the zones 706. As such, the first zone 712 may be referred to as an active zone. The diagram 700 depicts cell/beam coverage 714, zone/beam coverage 716, and active zone/beam coverage 718 with respect to the cell 704 and the zones 706. In an example, a network node (e.g., a gNB) may divide the cell 704 into the zones 706 and the network node may provide (e.g., via a satellite) UEs with indications of the zones 706.

As part of a first layer (Layer-1) of two-layer beam hopping, the satellite 708 may relay/transmit an SSB 720 and/or a SIB 722 for the cell 704 (i.e., cell/SSB-specific with narrowband for larger coverage). For instance, the satellite 708 may relay/transmit the SSB 720 and/or the SIB 722 over a relatively narrow bandwidth using a relatively wide beam that covers a relatively large area, which may avoid or mitigate frequent SSB searching and/or cell handovers. In an example, the SSB 720 may be a periodic SSB and the SIB 722 may be a periodic SIB. In an example, the SIB 722 may be at least a minimum SIB for accessing a cell. A network node (e.g., a base station, a gNB) may coordinate cell/SSB beam hopping patterns for cell/SSB coverage. For instance, the network node may provide the cell/SSB beam hopping patterns to the satellite 708, where the satellite 708 may then implement the cell/SSB beam hopping patterns. In an example, the satellite 708 may support simultaneous transmissions if SSBs are frequency division multiplexed (FDMed) or the satellite 708 may not support simultaneous transmissions if the SSBs are time division multiplexed (TDMed).

As part of a second layer (Layer-2) of two-layer beam hopping, the satellite 708 may relay/transmit a CSI-RS 724 and/or a DM-RS 726 for the first zone 712 within the cell 704 (i.e., zone/CSI-RS-specific with wideband for smaller coverage within a cell). For instance, the satellite 708 may relay/transmit the CSI-RS 724 and/or the DM-RS 726 over a relatively wide bandwidth using a relatively narrow beam that points to the first zone 712. In an example, if the UE 710 is determined to be in the first zone 712, the satellite 708 may relay/transmit the CSI-RS 724 and/or the DM-RS 726 over the relatively wide bandwidth using the relatively narrow beam that points to the first zone 712, whereas if the UE 710 is not in the first zone 712, the satellite 708 may not relay/transmit the CSI-RS 724 and/or the DM-RS 726 over the relatively wide bandwidth using the relatively narrow beam that points to the first zone 712. A network node (e.g., a base station, a gNB) may coordinate zone hopping patterns for active zones (and not for inactive zones). In an example, the satellite 708 may support simultaneous transmissions if active zones (e.g., the first zone 712) are located relatively far away from one another or the satellite 708 may not support simultaneous transmissions with an overlapped or partially overlapped spectrum if the active zones are located relatively close to one another.

In an example, the satellite 708 may transmit an SSB and/or a system information block type 1 (SIB1) to represent a minimum SIB indicating parameters for UE to use to access a 5G NR wireless communication system via NTN access) (referred to hereafter as C1 SSB/SIB1 728) for a first cell 730 (referred to in FIG. 7 as "C1"), an SSB and/or a SIB1 (referred to hereafter as C2 SSB/SIB1 732) for a second cell 734 (referred to in FIG. 7 as "C2"), and an SSB and/or a SIB1 (referred to hereafter as C3 SSB/SIB1 736) for a third cell 738 (referred to in FIG. 7 as "C3") in the same time slot, but at different frequencies. In an example, the first cell 730 may be or include the cell 704 and the C1 SSB/SIB1 728 may be or include the SSB 720 and/or the SIB 722. In an example, the first cell 730 may have a first active zone 740 (referred to in FIG. 7 as "AZ1"), the second cell 734 may have a second active zone 742 (referred to in FIG. 7 as "AZ2"), and the third cell 738 may have a third active zone 744 (referred to in FIG. 7 as "AZ3"). In an example, the first active zone 740 may be or include the first zone 712 that includes the UE 710. The satellite 708 may transmit on-demand signals/data for the first cell 730 (referred to hereafter as "C1 on-demand signals/data 746"), on-demand signals/data for the second cell 734 (referred to hereafter as "C2 on-demand signals/data 748"), and on-demand signals/data for the third cell 738 (referred to hereafter as "C3 on-demand signals/data 750") in different time slots, but at the same frequency. In an example, the C1 on-demand signals/data 746 may be or include the CSI-RS 724 and/or the DM-RS 726.

Stated differently, the satellite 708 may relay/transmit the SSB 720 and/or the SIB 722 over a first bandwidth 752 and a first beam 754, and the satellite 708 may relay/transmit the CSI-RS 724 and/or the DM-RS 726 over a second bandwidth 756 and a second beam 758, where the first bandwidth 752 may be less than the second bandwidth 756, and where a first width 760 of the first beam 754 may be greater than a second width 762 of the second beam 758.

FIG. 8 is a diagram 800 illustrating an example 802 of serving zone selection for radio resource control (RRC) connected UEs. In beam management for RRC connected UEs (which may be referred to as "RRC_CONNECTED UEs" or as "a UE that is in an RRC connected state"), beam sweeping (e.g., beam sweeping based on a CSI-RS) may occur across multiple zones, which may not be feasible because it may result in line-of-sight (LOS) interference to UEs located in different zones. A UE that is in an RRC connected state may be capable of transferring data, may have an RRC context established, may have a core network connection established, and may have network-controlled mobility. Uplink (UL) sounding reference signal (SRS) (UL-SRS) based beam management may not be suitable due to higher uplink power consumption and relatively long times for frequency hopping over a wide bandwidth. Furthermore, beam reporting of layer 1 (L1) reference signal received power (RSRP) (L1-RSRP) measurements based on a CSI-RS may have a relatively large latency and a selected beam may be outdated due to a relatively long round trip time (RTT) and a fast moving satellite.

Instead of performing the aforementioned beam management, in a first example 804, an RRC_CONNECTED UE 806 (e.g., the UE 104, the UE 350, the UE 710, etc.) may be configured to report a location of the RRC_CONNECTED UE 806 (referred to hereafter as "RRC_CONNECTED UE location 808") to a network node 810 (e.g., the base station 102, the base station 310, a gNB, etc.). In one example, the RRC_CONNECTED UE 806 may transmit the RRC_CO-NNECTED UE location 808 to a satellite (e.g., the satellite 708), whereupon the satellite may relay/transmit the RRC_CONNECTED UE location 808 to the network node 810. In another example, the RRC_CONNECTED UE 806 may transmit the RRC_CONNECTED UE location 808 to the network node 810 without using the satellite. As a location of the RRC_CONNECTED UE 806 may change slowly relative to a long communication distance with the satellite (e.g., the satellite 708), a suitable beam for the UE may be estimated based on the RRC_CONNECTED UE location 808 due to a LOS channel between the satellite and the UE. In one aspect, the RRC_CONNECTED UE location 808 may be or include coarse location information, such as "coarseLocationInfo-R17." However, for more accurate location information, a UE may be configured to report LocationInfo with a higher granularity than "coarseLoca-tionInfo-R17." The network node 810 may use the RRC_CONNECTED UE location 808 to selecting a serving zone for the RRC_CONNECTED UE 806. The RRC_CON-NECTED UE 806 and/or the network node 810 may then perform beam related functionality based on the RRC_CO-NNECTED UE location 808.

In a second example 812, the network node 810 may configure zone information for the UE via unicast RRC signaling and the UE may report a selected zone identifier (ID) to the network node 810. With more particularity, the network node 810 may transmit, for the RRC_CON-NECTED UE 806, RRC signaling 814, where the RRC signaling 814 may include a zone configuration 816. In one example, the network node 810 may transmit the RRC signaling 814 to a satellite (e.g., the satellite 708), where-upon the satellite may relay/transmit the RRC signaling 814 to the RRC_CONNECTED UE 806. In another example, the network node 810 may transmit the RRC signaling 814 to the RRC_CONNECTED UE 806 without using the satellite.

In one aspect, the zone configuration 816 may indicate/include two-dimensional (2D) or three-dimensional (3D) geofencing information for zones (referred to hereafter as "zone geofencing information 818"). In an example, the zone geofencing information 818 may include indications of boundaries (e.g., 2D boundaries (latitude and longitude), 3D boundaries (latitude, longitude, elevation)) of the zones and zone IDs for the zones. In an example, the zone geofencing information 818 may be for the zones 706, including the first zone 712. The RRC_CONNECTED UE 806 may select a zone ID (i.e., a serving zone ID 822) for a zone if the RRC_CONNECTED UE 806 is located within the zone.

In another aspect, the zone configuration 816 may indicate or include center zone location information 820 for zones, where the center zone location information 820 indicates a center (or central) location for each zone in the zone. In an example, the center zone location information 820 may include a center location (e.g., in latitude and longitude) for each zone in the zones and a zone ID for each zone in the zones. In an example, the center zone location information 820 may include or indicate center locations of each of the zones 706, including the first zone 712. The RRC_CONNECTED UE 806 may select a zone ID (i.e., the serving zone ID 822) for a zone that has a center that has a closest distance to a location of the RRC_CONNECTED UE 806.

In the second example 812, the RRC_CONNECTED UE 806 may transmit, for the network node, the serving zone ID 822. In one example, the RRC_CONNECTED UE 806 may transmit the serving zone ID 822 to a satellite (e.g., the satellite 708), whereupon the satellite may relay/transmit the serving zone ID 822 to the network node 810. In another example, the RRC_CONNECTED UE 806 may transmit the serving zone ID 822 to the network node 810 without using the satellite. The RRC_CONNECTED UE 806 and/or the network node 810 may then perform beam related function-ality based on the serving zone ID 822.

FIG. 9 is a diagram 900 illustrating an example 902 of serving zone selection for RRC idle or RRC inactive UEs. RRC idle UEs (which may be referred to as "RRC_IDLE UEs" or as "a UE that is in an RRC idle state") and RRC inactive UEs (which may be referred to as "RRC_INAC-TIVE UEs" or as "a UE that is in an RRC inactive state") may not be able to report their locations to a network node (e.g., a base station, a gNB) for security reasons. A UE that is in an RRC idle state may not be capable of transferring data, may not have an RRC context established, may not have a core network connection, and may have device-controlled mobility. A UE that is in an RRC inactive state may not be capable of data transfer with security protection, may have an RRC context established, may have a core network connection established previously, and may have device-controlled mobility. The diagram 900 depicts cell/beam coverage 903 and zone/beam coverage 905.

In one aspect, a network node (e.g., a base station, a gNB) may configure zone information in a SIB. In an example, a network node 904 (e.g., a base station, a gNB) may transmit a SIB 906, where the SIB 906 may include a zone configu-ration 908. In an example, the SIB 906 may be or include the SIB 722. The zone configuration 908 may be similar or identical to the zone configuration 816. In an example, the zone configuration 908 may include zone geofencing infor-mation 910, where the zone geofencing information 910 may be similar or identical to the zone geofencing informa-tion 818. In another example, the zone configuration 908 may include center zone location information 912, where the center zone location information 912 may be similar or identical to the center zone location information 820.

The network node 904 may transmit the SIB 906. A satellite 914 (e.g., the satellite 708) may perform beamform-ing and/or frequency band conversion associated with the SIB 906 and the satellite 914 may transmit the SIB 906 (e.g., over the first beam 754 and the first bandwidth 752). An RRC_IDLE/RRC_INACTIVE UE 916 (e.g., the UE 104, the UE 350, the UE 504, the UE 604, the UE 710, etc.) may receive the SIB 906.

In one aspect in which the zone configuration 908 includes/indicates the zone geofencing information 910, the RRC_IDLE/RRC_INACTIVE UE 916 may select a zone ID (i.e., a serving zone ID 918) for a zone if the RRC_IDLE/RRC_INACTIVE UE 916 is located within the zone. In another aspect in which the zone configuration 908 includes/indicates the center zone location information 912, the RRC_IDLE/RRC_INACTIVE UE 916 may select the zone ID (i.e., the serving zone ID 918) for the zone that has a center that has a closest distance to a location of the RRC_IDLE/RRC_INACTIVE UE 916.

In one example, the RRC_IDLE/RRC_INACTIVE UE 916 may transmit the serving zone ID 918 to the satellite 914, whereupon the satellite 914 may relay/transmit the serving zone ID 918 to the network node 904. In another example, the RRC_IDLE/RRC_INACTIVE UE 916 may transmit the serving zone ID 918 to the network node 904 without using the satellite 914.

A UE may indicate a serving zone of a cell during initial access to the cell. In one example, cell-specific physical random access channel (PRACH) resources may be config-ured by a SIB and a UE may report a zone ID in a message 3 (msg3) or a message A (msgA) associated with a random access channel (RACH) procedure. For instance, the SIB 906 may include an indication of cell-specific PRACH resources 920. The cell-specific PRACH resources 920 may include time and frequency resources. The RRC_IDLE/RRC_INACTIVE UE 916 may select the serving zone ID 918 as described above and the RRC_IDLE/RRC_INAC-TIVE UE 916 may transmit the serving zone ID 918 (or an indication thereof) in a msg3 or a msgA of a RACH procedure, where the serving zone ID 918 (or the indication thereof) are transmitted using the cell-specific PRACH resources 920. In one example, the RRC_IDLE/RRC_I-NACTIVE UE 916 may transmit the msg3 or the msgA to the satellite 914, whereupon the satellite 914 may relay/transmit the msg3 or the msgA to the network node 904. In another example, the RRC_IDLE/RRC_INACTIVE UE 916 may transmit the msg3 or the msgA to the network node 904 without using the satellite 914. An early indication of the selected zone (i.e., the serving zone ID 918) may enable a zone-specific beam for a UE (the RRC_IDLE/RRC_INAC-TIVE UE 916) before an RRC connection is established.

In another example, zone-specific PRACH resources may be configured by a SIB and a UE may use the zone-specific PRACH resources of a serving zone. For instance, the SIB 906 may include an indication of zone-specific PRACH resources 922. The zone-specific PRACH resources 922 may include time and frequency resources. The RRC_IDLE/RRC_INACTIVE UE 916 may select the serving zone ID 918 as described above and the RRC_IDLE/RRC_INAC-TIVE UE 916 may transmit a PRACH in the zone-specific PRACH resources 922 (i.e., a preamble of a RACH proce-dure, referred to hereafter as a zone-specific PRACH 924) associated with the serving zone ID 918 (or an indication thereof). In one example, the RRC_IDLE/RRC_INACTIVE UE 916 may transmit the zone-specific PRACH 924 to the satellite 914, whereupon the satellite 914 may relay/transmit the zone-specific PRACH 924 to the network node 904. In another example, the RRC_IDLE/RRC_INACTIVE UE 916 may transmit the zone-specific PRACH 924 to the network node 904 without using the satellite 914.

FIG. 10 is a diagram 1000 illustrating an example 1002 of beam transmission multiplexing and power boosting. A zone-specific beam (e.g., the second beam 758) and a cell-specific beam (e.g., the first beam 754) may be transmitted in TDM or FDM. TDM may refer to a physical layer technique of transmitting and receiving independent signals over a common signal path by means of synchronized switches at each end of a transmission line such that each signal appears on the transmission line only a fraction of the time in an alternating pattern. As such, in TDM, devices may share the same frequency channel, but use a part of the capacity of the frequency channel. FDM may refer to a physical layer technique in which multiple baseband signals are modulated on different frequency carrier waves and added together to create a composite signal. An effect of FDM is to divide a transmission bandwidth into multiple subchannels, each of which may be dedicated to a particular baseband signal.

The diagram 1000 depicts an example of frequency division multiplexed (FDMed) beams 1004, where the FDMed beams 1004 may include a cell-specific beam 1006 (e.g., the first beam 754) and a zone-specific beam 1008 (e.g., the second beam 758). In the case of the FDMed beams 1004, the cell-specific beam 1006 (i.e., a cell/SSB-specific beam transmission) may not be able to be power boosted. As such, a UE (e.g., the UE 104, the UE 350, the UE 710, etc.) may use multi-shot combining to improve a link budget when accessing the cell/SSB. Power boosting may refer to increasing a power associated with a transmission.

The diagram 1000 also depicts an example of time division multiplexed (TDMed) beams 1010, where the TDMed beams 1010 may include the cell-specific beam 1006 and the zone-specific beam 1008. In the case of the TDMed beams 1010, the cell-specific beam 1006 (i.e., a cell/SSB-specific beam transmission) may be able to be power boosted (e.g., by a network node) in order to enlarge cell/SSB coverage.

In one aspect, both TDM and FDM may be supported for the cell-specific beam 1006 and the zone-specific beam 1008. In one aspect, an energy per resource element (EPRE) for an SSB may be different based on whether the SSB is power boost (e.g., such as in the TDM case) or not (e.g., such as in the FDM case), and may be separately indicated in a different time slot than time slot(s) of the SSB. For instance, the SSB may be transmitted in SSB slot(s) 1012 and EPRE values for the SSB may be transmitted in an SSB EPRE slot 1014. In one aspect, a power offset of a non-zero-power CSI-RS resource element (RE) relative to an SSS RE may be different in TDM and FDM cases, and separately indicated in a different time slot than time slot(s) of the CSI-RS. For instance, a CSI-RS may be transmitted in CSI-RS slot(s) 1016 and a power offset of a non-zero-power CSI RE relative to an SSS RE may be transmitted in a power offset slot 1018.

Figure 11:
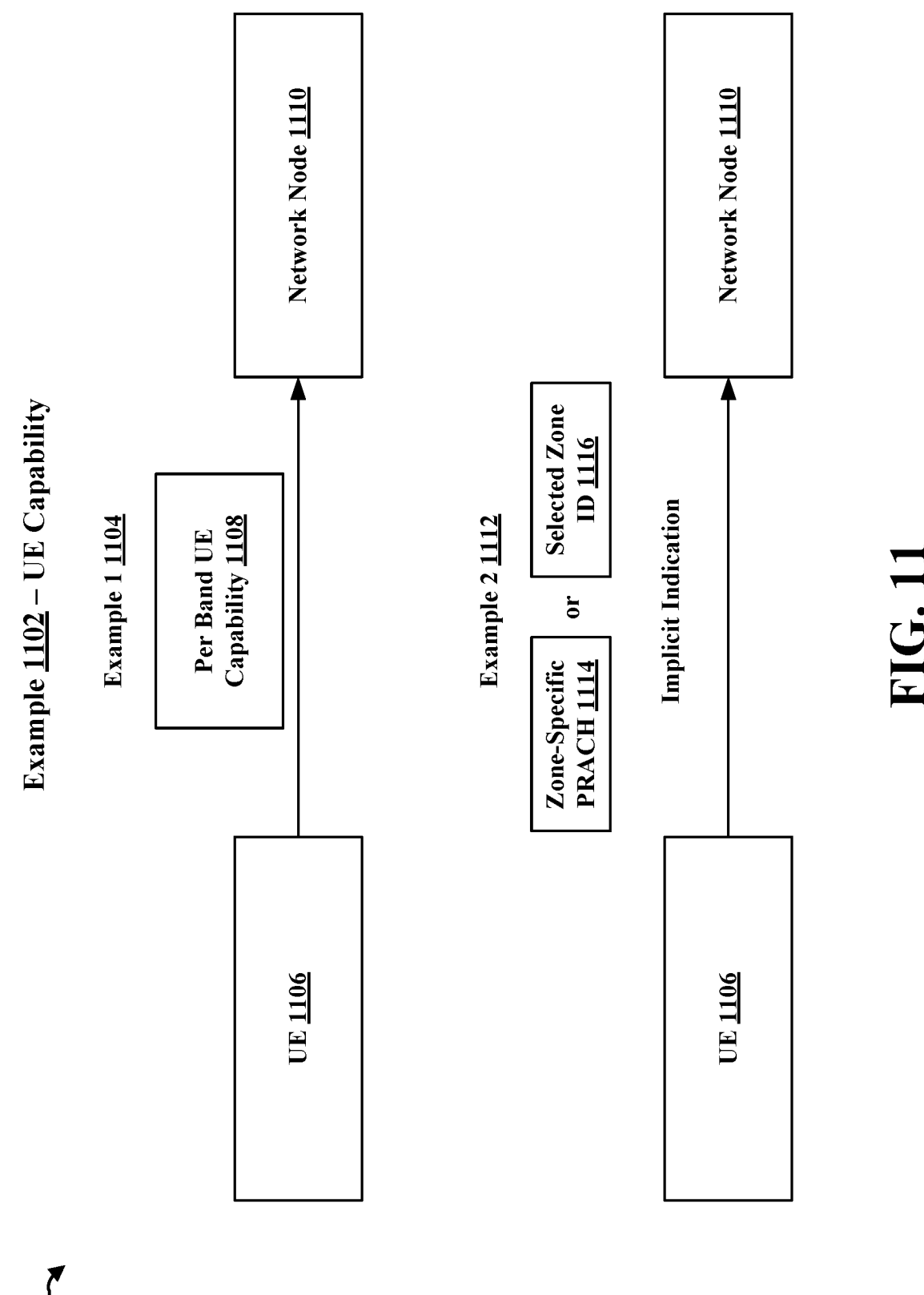
FIG. 11 is a diagram illustrating an example of aspects pertaining to UE capability.

FIG. 11 is a diagram 1100 illustrating an example 1102 of aspects pertaining to UE capability. A UE (e.g., the UE 104, the UE 350, the UE 710, etc.) may support a cell/SSB-specific beam (e.g., the first beam 754, the cell-specific beam 1006). The UE may also support a zone-specific beam (e.g., the second beam 758, the zone-specific beam 1008).

In a first example 1104, a UE 1106 (e.g., the UE 104, the UE 350, the UE 710, etc.) may report a per band UE capability 1108 to a network node 1110 (e.g., a base station, a gNB, etc.). In an example, the per band UE capability 1108 may indicate that the UE 1106 supports FR1 for a cell/SSB-specific beam (e.g., the first beam 754, the cell-specific beam 1006) and that the UE 1106 supports FR2 for a zone-specific beam (e.g., the second beam 758, the zone-specific beam 1008). In one aspect, the UE 1106 may transmit the per band UE capability 1108 to a satellite (e.g., the satellite 708), whereupon the satellite may relay/transmit the per band UE capability 1108 to the network node 1110. In another example, the UE 1106 may transmit the per band UE capability 1108 to the network node 1110 without using the satellite.

In a second example 1112, the UE 1106 may transmit a zone-specific PRACH 1114 (e.g., the zone-specific PRACH 924) or a selected zone ID 1116 (e.g., the serving zone ID 822, the serving zone ID 918, etc.) for the network node 1110, where the zone-specific PRACH 1114 or the selected zone ID 1116 may implicitly indicate that the UE 1106 supports a cell/SSB-specific beam (e.g., the first beam 754, the cell-specific beam 1006) and a zone-specific beam (e.g., the second beam 758, the zone-specific beam 1008). In one aspect, the UE 1106 may transmit the zone-specific PRACH 1114 or the selected zone ID 1116 to a satellite (e.g., the satellite 708), whereupon the satellite may relay/transmit the zone-specific PRACH 1114 or the selected zone ID 1116 to the network node 1110. In another example, the UE 1106 may transmit the zone-specific PRACH 1114 or the selected zone ID 1116 to the network node 1110 without using the satellite.

Figure 12:
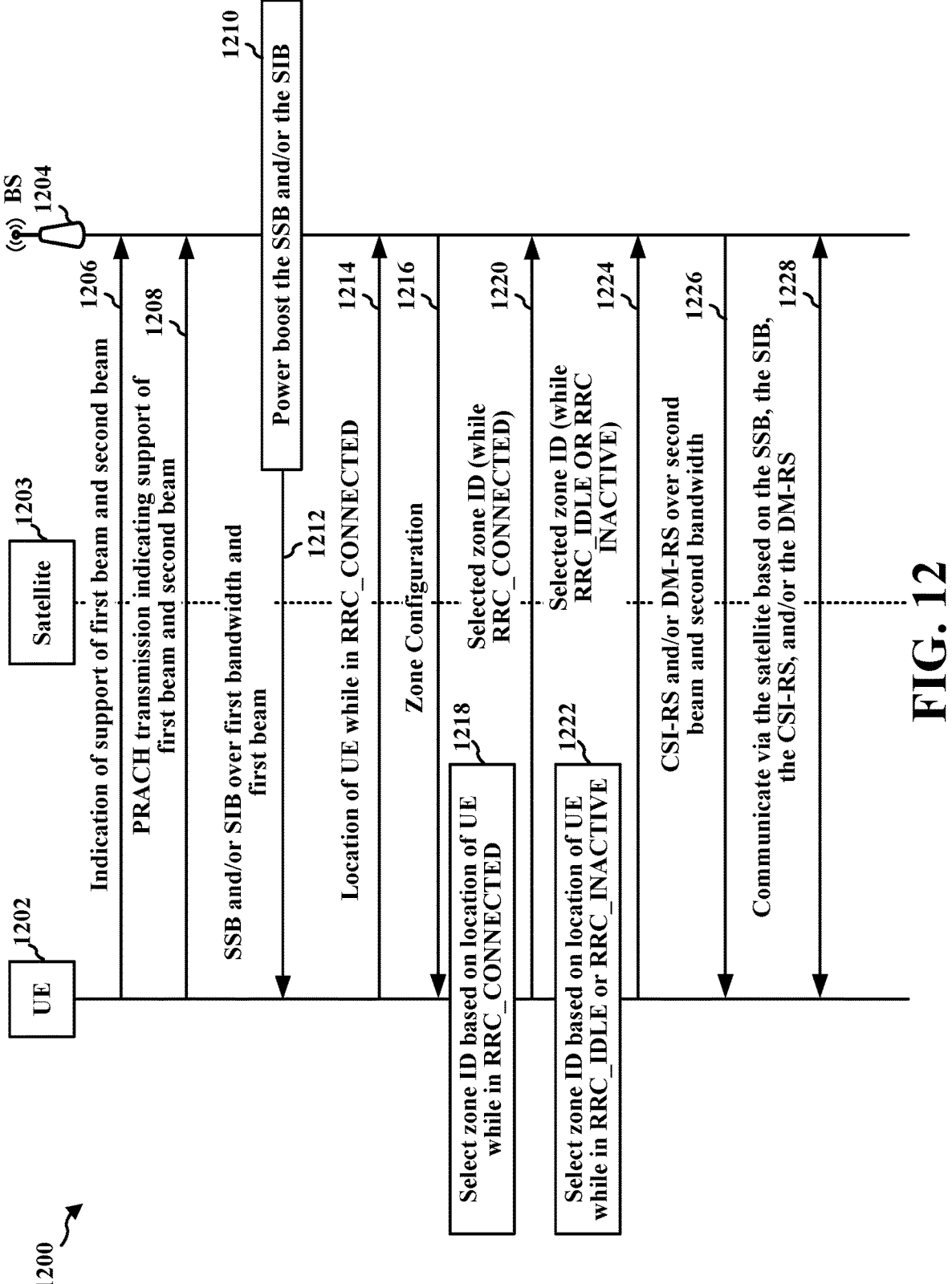
FIG. 12 is a communications flow diagram illustrating example communications between a UE, a satellite, and a base station.

FIG. 12 is a communications flow diagram 1200 illustrating example communications between a UE 1202, a satellite 1203, and a base station 1204. In an example, the UE 1202 may be or include the UE 104, the UE 350, the UE 504, the UE 604, the UE 710, the RRC_CONNECTED UE 806, the RRC_IDLE/RRC_INACTIVE UE 916, and/or the UE 1106. In an example, the satellite 1203 may be or include the satellite 506, the satellite 606, the satellite 708, and/or the satellite 914. In an example, the base station 1204 may be or include the base station 102, the base station 310, the network node 810, the network node 904, and/or the network node 1110.

At 1212, the UE 1202 may receive, via the satellite 1203 and over a first bandwidth and a first beam, at least one of a synchronization signal block (SSB) or a system information block (SIB) for a cell. At 1226, the UE 1202 may receive, via the satellite 1203 and over a second bandwidth and a second beam, at least one of a channel-state information reference signal (CSI-RS) or a demodulation reference signal (DM-RS) for data transmission for a zone within the cell, where the first bandwidth is less than the second bandwidth, and where a first width of the first beam is greater than a second width of the second beam. At 1228, the UE 1202 may communicate via the satellite 1203 based on at least one of the SSB, the SIB, the CSI-RS, or the DM-RS.

In one aspect, at 1214, the UE 1202 may transmit, for a network node (e.g., the base station 1204), an indication of a location of the UE 1202 while the UE is in a radio resource control (RRC) connected state, where receiving at least one of the CSI-RS or the DM-RS for the zone within the cell at 1226 may include receiving at least one of the CSI-RS or the DM-RS for the zone within the cell based on the indication of the location of the UE.

In one aspect, at 1216, the UE 1202 may receive, via radio resource control (RRC) signaling and while the UE 1202 is in a radio resource control (RRC) connected state, a zone configuration including a set of zone identifiers (IDs) for zones in the cell, where the set of zone IDs includes a zone identifier (ID) for the zone within the cell. At 1218, the UE 1202 may select the zone ID for the zone based on a location of the UE 1202. At 1220, the UE 1202 may transmit, for a network node (e.g., the base station 1204), an indication of the selected zone ID, and where receiving at least one of the CSI-RS or the DM-RS for the zone within the cell at 1226 may include receiving at least one of the CSI-RS or the DM-RS for the zone within the cell based on the selected zone ID.

In one aspect, the SIB for the cell may include a zone configuration including a set of zone identifiers (IDs) for zones in the cell and the set of zone IDs may include a zone identifier (ID) for the zone within the cell, and at 1222, the UE 1202 may select, while the UE 1202 is in a radio resource control (RRC) idle state or while the UE 1202 is in an RRC inactive state, the zone ID for the zone based on a location of the UE 1202. At 1224, the UE 1202 may transmit, during initial cell access of the cell, an indication of the selected zone ID, and where receiving at least one of the CSI-RS or the DM-RS for the zone within the cell at 1226 may include receiving at least one of the CSI-RS or the DM-RS for the zone within the cell based on the selected zone ID.

In one aspect, at 1206, the UE 1202 may transmit, for a network node (e.g., the base station 1204), an indication that the UE 1202 supports the first beam and the second beam, where receiving at least one of the SSB or the SIB at 1212 and receiving at least one of the CSI-RS or the DM-RS at 1226 may include receiving at least one of the SSB or the SIB and receiving at least one of the CSI-RS or the DM-RS based on the transmitted indication that the UE supports the first beam and the second beam.

In one aspect, at 1208, the UE 1202 may transmit a physical random-access channel (PRACH) transmission during a random-access channel (RACH) procedure, where the PRACH transmission indicates that the UE supports the first beam and the second beam.

In one aspect, at 1210, the base station 1204 may power boost at least one of the SSB or the SIB, and where transmitting at least one of the SSB or the SIB includes transmitting at least one of the power boosted SSB or the power boosted SIB.

FIG. 13 is a flowchart 1300 of a method of wireless communication. The method may be performed by a UE (e.g., the UE 104, the UE 350, the UE 504, the UE 604, the UE 710, the RRC_CONNECTED UE 806, the RRC_IDLE/ RRC_INACTIVE UE 916, the UE 1106, the UE 1202, and/or the apparatus 1704). The method may be associated with various advantages at the UE, such as increased resource utilization. In an example, the method may be performed by the NTN component 198.

At 1302, the UE receives, via a satellite and over a first bandwidth and a first beam, at least one of a synchronization signal block (SSB) or a system information block (SIB) for a cell. For example, FIG. 12 at 1212 shows that the UE 1202 may receive, via the satellite 1203 and over a first bandwidth and a first beam, at least one of a synchronization signal block (SSB) or a system information block (SIB) for a cell. In an example, the satellite may be or include the satellite 506, the satellite 606, the satellite 708, the satellite 914, and/or the satellite 1203. In an example, the first bandwidth may be the first bandwidth 752 and the first beam may be the first beam 754. In another example, the first beam may be the cell-specific beam 1006. In an example, the SSB may be the SSB 720 and the SIB may be the SIB 722. In another example, the SIB 722 may be the SIB 906. In an example, the cell may be the cell 704. In an example, 1302 may be performed by the NTN component 198.

At 1304, the UE receives, via the satellite and over a second bandwidth and a second beam, at least one of a channel-state information reference signal (CSI-RS) or a demodulation reference signal (DM-RS) for data transmission for a zone within the cell, where the first bandwidth is less than the second bandwidth, and where a first width of the first beam is greater than a second width of the second beam. For example, FIG. 12 at 1226 shows that the UE 1202 may receive, via the satellite 1203 and over a second bandwidth and a second beam, at least one of a channel-state information reference signal (CSI-RS) or a demodulation reference signal (DM-RS) for data transmission for a zone within the cell, where the first bandwidth may be less than the second bandwidth, and where a first width of the first beam may be greater than a second width of the second beam. In an example, the second bandwidth may be the second bandwidth 756 and the second beam may be the second beam 758. In an example, the CSI-RS may be the CSI-RS 724 and the DM-RS may be the DM-RS 726. In an example, the zone may be the first zone 712. In an example, the first width may be the first width 760 and the second width may be the second width 762. In an example, 1304 may be performed by the NTN component 198.

At 1306, the UE communicates via the satellite based on at least one of the SSB, the SIB, the CSI-RS, or the DM-RS. For example, FIG. 12 at 1228 shows that the UE 1202 may communicate via the satellite 1203 based on at least one of the SSB, the SIB, the CSI-RS, or the DM-RS. In an example, 1306 may be performed by the NTN component 198.

FIG. 14 is a flowchart 1400 of a method of wireless communication. The method may be performed by a UE (e.g., the UE 104, the UE 350, the UE 504, the UE 604, UE 710, the RRC_CONNECTED UE 806, the RRC_IDLE/ RRC_INACTIVE UE 916, the UE 1106, the UE 1202, and/or the apparatus 1704). The method may be associated with various advantages at the UE, such as increased resource utilization. In an example, the method (including the various aspects detailed below) may be performed by the NTN component 198.

At 1406, the UE receives, via a satellite and over a first bandwidth and a first beam, at least one of a synchronization signal block (SSB) or a system information block (SIB) for a cell. For example, FIG. 12 at 1212 shows that the UE 1202 may receive, via the satellite 1203 and over a first bandwidth and a first beam, at least one of a synchronization signal block (SSB) or a system information block (SIB) for a cell. In an example, the satellite may be or include the satellite 506, the satellite 606, the satellite 708, the satellite 914, and/or the satellite 1203. In an example, the first bandwidth may be the first bandwidth 752 and the first beam may be the first beam 754. In another example, the first beam may be the cell-specific beam 1006. In an example, the SSB may be the SSB 720 and the SIB may be the SIB 722. In another example, the SIB 722 may be the SIB 906. In an example, the cell may be the cell 704. In an example, 1406 may be performed by the NTN component 198.

At 1420, the UE receives, via the satellite and over a second bandwidth and a second beam, at least one of a channel-state information reference signal (CSI-RS) or a demodulation reference signal (DM-RS) for data transmission for a zone within the cell, where the first bandwidth is less than the second bandwidth, and where a first width of the first beam is greater than a second width of the second beam. For example, FIG. 12 at 1226 shows that the UE 1202 may receive, via the satellite 1203 and over a second bandwidth and a second beam, at least one of a channel-state information reference signal (CSI-RS) or a demodulation reference signal (DM-RS) for data transmission for a zone within the cell, where the first bandwidth may be less than the second bandwidth, and where a first width of the first beam may be greater than a second width of the second beam. In an example, the second bandwidth may be the second bandwidth 756 and the second beam may be the second beam 758. In an example, the CSI-RS may be the CSI-RS 724 and the DM-RS may be the DM-RS 726. In an example, the zone may be the first zone 712. In an example, the first width may be the first width 760 and the second width may be the second width 762. In an example, 1420 may be performed by the NTN component 198.

At 1422, the UE communicates via the satellite based on at least one of the SSB, the SIB, the CSI-RS, or the DM-RS. For example, FIG. 12 at 1228 shows that the UE 1202 may communicate via the satellite 1203 based on at least one of the SSB, the SIB, the CSI-RS, or the DM-RS. In an example, 1422 may be performed by the NTN component 198.

In one aspect, receiving at least one of the CSI-RS or the DM-RS for the zone within the cell may include receiving at least one of the CSI-RS or the DM-RS for the zone within the cell when the UE is in the zone over the second beam, and where the second beam may be directed towards the zone. For example, receiving at least one of the CSI-RS or the DM-RS for the zone within the cell at 1226 may include receiving at least one of the CSI-RS or the DM-RS for the zone within the cell when the UE 1202 is in the zone over the second beam, and where the second beam may be directed towards the zone. In an example, FIG. 7 shows that the UE 710 may be in the first zone 712. In an example, the second beam 758 may be directed towards the first zone 712.

In one aspect, at 1408, the UE may transmit, for a network node, an indication of a location of the UE while the UE is in a radio resource control (RRC) connected state, where receiving at least one of the CSI-RS or the DM-RS for the zone within the cell may include receiving at least one of the CSI-RS or the DM-RS for the zone within the cell based on the indication of the location of the UE. For example, FIG. 12 at 1214 shows that the UE 1202 may transmit, for a network node (e.g., the base station 1204), an indication of a location of the UE 1202 while the UE 1202 is in a radio resource control (RRC) connected state, where receiving at least one of the CSI-RS or the DM-RS for the zone within the cell at 1226 may include receiving at least one of the CSI-RS or the DM-RS for the zone within the cell based on the indication of the location of the UE 1202. In an example, the indication of the location of the UE may be the RRC_ CONNECTED UE location 808. In an example, 1408 may be performed by the NTN component 198.

In one aspect, at 1410, the UE may receive, via radio resource control (RRC) signaling and while the UE is in a radio resource control (RRC) connected state, a zone configuration including a set of zone identifiers (IDs) for zones in the cell, where the set of zone IDs may include a zone identifier (ID) for the zone within the cell. For example, FIG. 12 at 1216 shows that the UE 1202 may receive, via radio resource control (RRC) signaling and while the UE 1202 is in a radio resource control (RRC) connected state, a zone configuration including a set of zone identifiers (IDs) for zones in the cell, where the set of zone IDs may include a zone identifier (ID) for the zone within the cell. In an example, the RRC signaling may be the RRC signaling 814 and the zone configuration may be the zone configuration 816. The zone configuration 816 may include a set of zone identifiers (IDs) for zones in the cell, where the set of zone IDs may include a zone identifier (ID) for the zone within the cell. In an example, the zones may be the zones 706. In an example, 1410 may be performed by the NTN component 198.

In one aspect, at 1412, the UE may select the zone ID for the zone based on a location of the UE. For example, FIG. 12 at 1218 shows that the UE 1202 may select the zone ID for the zone based on a location of the UE 1202. In an example, the zone ID may be the serving zone ID 822. In an example, 1412 may be performed by the NTN component 198.

In one aspect, at 1414, the UE may transmit, for a network node, an indication of the selected zone ID, and receiving at least one of the CSI-RS or the DM-RS for the zone within the cell may include receiving at least one of the CSI-RS or the DM-RS for the zone within the cell based on the selected zone ID. For example, FIG. 12 at 1220 shows that the UE 1202 may transmit, for a network node (e.g., the base station 1204), an indication of the selected zone ID, and receiving at least one of the CSI-RS or the DM-RS for the zone within the cell at 1226 may include receiving at least one of the CSI-RS or the DM-RS for the zone within the cell based on the selected zone ID. In an example, the selected zone ID may be the serving zone ID 822. In an example, 1414 may be performed by the NTN component 198.

In one aspect, the zone configuration may further includes at least one of a two-dimensional (2D) geofencing boundary for the zone or a three-dimensional (3D) geofencing boundary for the zone, and selecting the zone ID for the zone may include selecting the zone ID for the zone based on the location of the UE being within at least one of the 2D geofencing boundary for the zone or the 3D geofencing boundary for the zone. For example, the zone configuration may be the zone configuration 816, and at least one of the 2D geofencing boundary or the 3D geofencing boundary for the zone may be included in the zone geofencing information 818. In an example, selecting the zone ID for the zone at 1218 may include selecting the zone ID for the zone based on the location of the UE 1202 being within at least one of the 2D geofencing boundary for the zone or the 3D geofencing boundary for the zone.

In one aspect, the zone configuration may further indicate a central location of the zone, and selecting the zone ID for the zone may include selecting the zone ID for the zone based on a distance of the UE from the central location of the zone. For example, the zone configuration may be the zone configuration 816, and the indication of the central location of the zone may be included in the center zone location information 820. In an example, selecting the zone ID for the zone at 1218 may include selecting the zone ID for the zone based on a distance of the UE 1202 from the central location of the zone.

In one aspect, the SIB for the cell may include a zone configuration including a set of zone identifiers (IDs) for zones in the cell, where the set of zone IDs may include a zone identifier (ID) for the zone within the cell, and at 1416, the UE may select, while the UE is in a radio resource control (RRC) idle state or while the UE is in an RRC inactive state, the zone ID for the zone based on a location of the UE. In an example, the SIB may be the SIB 906 which may include a set of zone IDs for zones in the cell. In an example, the zones may be the zones 706. In an example, FIG. 12 at 1222 shows that the UE 1202 may select, while the UE 1202 is in a radio resource control (RRC) idle state or while the UE 1202 is in an RRC inactive state, the zone ID for the zone based on a location of the UE 1202. In an example, the zone ID may be the serving zone ID 918. In an example, 1416 may be performed by the NTN component 198.

In one aspect, the SIB for the cell may include a zone configuration including a set of zone identifiers (IDs) for zones in the cell, where the set of zone IDs may include a zone identifier (ID) for the zone within the cell, and at 1418, the UE may transmit, during initial cell access of the cell, an indication of the selected zone ID, and where receiving at least one of the CSI-RS or the DM-RS for the zone within the cell may include receiving at least one of the CSI-RS or the DM-RS for the zone within the cell based on the selected zone ID. In an example, the SIB may be the SIB 906 which may include a set of zone IDs for zones in the cell. In an example, FIG. 12 at 1224 shows that the UE 1202 may transmit, during initial cell access of the cell, an indication of the selected zone ID, where receiving at least one of the CSI-RS or the DM-RS for the zone within the cell at 1228 may include receiving at least one of the CSI-RS or the DM-RS for the zone within the cell based on the selected zone ID. In an example, 1418 may be performed by the NTN component 198.

In one aspect, the zone configuration may further includes at least one of a two-dimensional (2D) geofencing boundary for the zone or a three-dimensional (3D) geofencing boundary for the zone, and where selecting the zone ID for the zone while the UE is in the RRC idle state or while the UE is in the RRC inactive state may include selecting the zone ID for the zone based on the location of the UE being within at least one of the 2D geofencing boundary for the zone or the 3D geofencing boundary for the zone. For example, the zone configuration may be the zone configuration 908, and at least one of the 2D geofencing boundary for the zone or the 3D geofencing boundary for the zone may be included in the zone geofencing information 910. In an example, selecting the zone ID for the zone while the UE is in the RRC idle state or while the UE is in the RRC inactive state at 1222 may include selecting the zone ID for the zone based on the location of the UE 1202 being within at least one of the 2D geofencing boundary for the zone or the 3D geofencing boundary for the zone.

In one aspect, the zone configuration may further indicate a central location of the zone, and where selecting the zone ID for the zone while the UE is in the RRC idle state or while the UE is in the RRC inactive state may include selecting the zone ID for the zone based on a distance of the UE from the central location of the zone. For example, the zone configuration may be the zone configuration 908, and the indication of the central location of the zone may be included in the center zone location information 912. In an example, selecting the zone ID for the zone while the UE is in the RRC idle state or while the UE is in the RRC inactive state at 1222 may include selecting the zone ID for the zone based on a distance of the UE from the central location of the zone.

In one aspect, the SIB may configure a cell-specific physical random-access channel (PRACH), and transmitting the indication of the selected zone ID may include transmitting the indication of the selected zone ID in a message A (msgA) or a message 3 (msg3) associated with the cell-specific PRACH. For example, the SIB 906 may configure a cell-specific PRACH (i.e., cell-specific PRACH resources), and transmitting the indication of the selected zone ID at 1224 may include transmitting the indication of the selected zone ID in a message A (msgA) or a message 3 (msg3) associated with the cell-specific PRACH.

In one aspect, the SIB may configure zone-specific physical random-access channel (PRACH) resources for the zones within the cell, and transmitting the indication of the selected zone ID may include transmitting a PRACH in a corresponding zone-specific PRACH resource for the zone. For example, the SIB 906 may configure the zone-specific PRACH resources 922, and transmitting the indication of the selected zone ID at 1224 may include transmitting a PRACH in a corresponding zone-specific PRACH resource for the zone.

In one aspect, the first beam and the second beam may be time division multiplexed or frequency division multiplexed. For example, the aforementioned aspect may correspond to the TDMed beams 1010 or the FDMed beams 1004.

In one aspect, at least one of the SSB or the SIB may be power boosted when the first beam and the second beam are time division multiplexed. For example, FIG. 12 at 1210 shows that at least one of the SSB or the SIB may be power boosted when the first beam and the second beam are time division multiplexed.

In one aspect, the SSB may be associated with a first time slot, where a second time slot may indicate (1) a first energy per resource element (EPRE) value for the SSB when the SSB is power boosted or (2) a second EPRE value for the SSB when the SSB is not power boosted. For example, the aforementioned aspect may correspond to FIG. 10. For instance, the first time slot may be or include the SSB slot(s) 1012 and the second time slot may be or include the SSB EPRE slot 1014.

In one aspect, the CSI-RS may be associated with a first time slot, where a second time slot may indicate (1) a first power offset of non-zero-power for a resource element (RE) of the CSI-RS relative to a secondary synchronization signal (SSS) RE for time division multiplexing or (2) a second power offset of the non-zero-power for the RE of the CSI-RS relative to the SSS RE for frequency division multiplexing. For example, the aforementioned aspect may correspond to FIG. 10. For instance, the first time slot may be or include the CSI-RS slot(s) 1016 and the second time slot may be or include the power offset slot 1018.

In one aspect, at 1402, the UE may transmit, for a network node, an indication that the UE supports the first beam and the second beam, where receiving at least one of the SSB or the SIB and receiving at least one of the CSI-RS or the DM-RS may include receiving at least one of the SSB or the SIB and receiving at least one of the CSI-RS or the DM-RS based on the transmitted indication that the UE supports the first beam and the second beam. For example, FIG. 12 at 1206 shows that the UE 1202 may transmit, for a network node (e.g., the base station 1204), an indication that the UE 1202 supports the first beam and the second beam, where receiving at least one of the SSB or the SIB at 1212 and receiving at least one of the CSI-RS or the DM-RS at 1226 may include receiving at least one of the SSB or the SIB and receiving at least one of the CSI-RS or the DM-RS based on the transmitted indication that the UE supports the first beam and the second beam. In another example, the aforementioned aspect may correspond to FIG. 11. In an example, 1402 may be performed by the NTN component 198.

In one aspect, the indication that the UE supports the first beam and the second beam may include a first indication that the UE supports a first band associated with the first beam and a second indication that the UE supports a second band associated with the second beam. For example, the indication that the UE supports the first beam and the second beam may or include the per band UE capability 1108, and the per band UE capability 1108 may include a first indication that the UE supports a first band associated with the first beam and a second indication that the UE supports a second band associated with the second beam.

In one aspect, at 1404, the UE may transmit a physical random-access channel (PRACH) transmission during a random-access channel (RACH) procedure, where the PRACH transmission may indicate that the UE supports the first beam and the second beam. For example, FIG. 12 at 1208 shows that the UE 1202 may transmit a physical random-access channel (PRACH) transmission during a random-access channel (RACH) procedure, where the PRACH transmission may indicate that the UE 1202 supports the first beam and the second beam. In an example, the aforementioned aspect may correspond to the second example 1112 in FIG. 11. In an example, 1404 may be performed by the NTN component 198.

In one aspect, receiving at least one of the CSI-RS or the DM-RS may include receiving at least one of the CSI-RS or the DM-RS further based on at least one of the SSB or the SIB. For example, receiving at least one of the CSI-RS or the DM-RS at 1226 may include receiving at least one of the CSI-RS or the DM-RS further based on at least one of the SSB or the SIB (received at 1212).

FIG. 15 is a flowchart 1500 of a method of wireless communication. The method may be performed by a network node (e.g., the base station 102, the base station 310, the network node 810, the network node 904, the network node 1110, the base station 1204, the network entity 1702, and/or the network entity 1802). The method may be associated with various advantages at the network node, such as increased resource utilization. In an example, the method may be performed by the NTN component 199.

At 1502, the network node transmits, via a satellite, at least one of a synchronization signal block (SSB) or a system information block (SIB) for a cell, where at least one of the SSB or the SIB is associated with a first bandwidth and a first beam. For example, FIG. 12 at 1212 shows that the base station 1204 may transmit, via the satellite 1203, at least one of a synchronization signal block (SSB) or a system information block (SIB) for a cell, where at least one of the SSB or the SIB is associated with a first bandwidth and a first beam. In an example, the satellite may be or include the satellite 506, the satellite 606, the satellite 708, the satellite 914, and/or the satellite 1203. In an example, the first bandwidth may be the first bandwidth 752 and the first beam may be the first beam 754. In another example, the first beam may be the cell-specific beam 1006. In an example, the SSB may be the SSB 720 and the SIB may be the SIB 722. In another example, the SIB 722 may be the SIB 906. In an example, the cell may be the cell 704. In an example, 1502 may be performed by the NTN component 199.

At 1504, the network node transmits, via the satellite, at least one of a channel-state information reference signal (CSI-RS) or a demodulation reference signal (DM-RS) for data transmission for a zone within the cell, where at least one of the CSI-RS or the DM-RS is associated with a second bandwidth and a second beam, where the first bandwidth is less than the second bandwidth, and where a first width of the first beam is greater than a second width of the second beam. For example, FIG. 12 at 1226 shows that the base station 1204 may transmit, via the satellite 1203, at least one of a channel-state information reference signal (CSI-RS) or a demodulation reference signal (DM-RS) for data transmission for a zone within the cell, where at least one of the CSI-RS or the DM-RS is associated with a second bandwidth and a second beam, where the first bandwidth is less than the second bandwidth, and where a first width of the first beam is greater than a second width of the second beam. In an example, the second bandwidth may be the second bandwidth 756 and the second beam may be the second beam 758. In an example, the CSI-RS may be the CSI-RS 724 and the DM-RS may be the DM-RS 726. In an example, the zone may be the first zone 712. In an example, the first width may be the first width 760 and the second width may be the second width 762. In an example, 1504 may be performed by the NTN component 199.

At 1506, the network node communicates with a user equipment (UE) via the satellite based on at least one of the SSB, the SIB, the CSI-RS, or the DM-RS. For example, FIG. 12 at 1228 shows that the base station 1204 may communicate with the UE 1202 via the satellite 1203 based on at least one of the SSB, the SIB, the CSI-RS, or the DM-RS. In an example, 1506 may be performed by the NTN component 199.

FIG. 16 is a flowchart 1600 of a method of wireless communication. The method may be performed by a network node (e.g., the base station 102, the base station 310, the network node 810, the network node 904, the network node 1110, the base station 1204, the network entity 1702, and/or the network entity 1802). The method may be associated with various advantages at the network node, such as increased resource utilization. In an example, the method (including the various aspects detailed below) may be performed by the NTN component 199.

At 1608, the network node transmits, via a satellite, at least one of a synchronization signal block (SSB) or a system information block (SIB) for a cell, where at least one of the SSB or the SIB is associated with a first bandwidth and a first beam. For example, FIG. 12 at 1212 shows that the base station 1204 may transmit, via the satellite 1203, at least one of a synchronization signal block (SSB) or a system information block (SIB) for a cell, where at least one of the SSB or the SIB is associated with a first bandwidth and a first beam. In an example, the satellite may be or include the satellite 506, the satellite 606, the satellite 708, the satellite 914, and/or the satellite 1203. In an example, the first bandwidth may be the first bandwidth 752 and the first beam may be the first beam 754. In another example, the first beam may be the cell-specific beam 1006. In an example, the SSB may be the SSB 720 and the SIB may be the SIB 722. In another example, the SIB 722 may be the SIB 906. In an example, the cell may be the cell 704. In an example, 1608 may be performed by the NTN component 199.

At 1618, the network node transmits, via the satellite, at least one of a channel-state information reference signal (CSI-RS) or a demodulation reference signal (DM-RS) for data transmission for a zone within the cell, where at least one of the CSI-RS or the DM-RS is associated with a second bandwidth and a second beam, where the first bandwidth is less than the second bandwidth, and where a first width of the first beam is greater than a second width of the second beam. For example, FIG. 12 at 1226 shows that the base station 1204 may transmit, via the satellite 1203, at least one of a channel-state information reference signal (CSI-RS) or a demodulation reference signal (DM-RS) for data transmission for a zone within the cell, where at least one of the CSI-RS or the DM-RS is associated with a second bandwidth and a second beam, where the first bandwidth is less than the second bandwidth, and where a first width of the first beam is greater than a second width of the second beam. In an example, the second bandwidth may be the second bandwidth 756 and the second beam may be the second beam 758. In an example, the CSI-RS may be the CSI-RS 724 and the DM-RS may be the DM-RS 726. In an example, the zone may be the first zone 712. In an example, the first width may be the first width 760 and the second width may be the second width 762. In an example, 1618 may be performed by the NTN component 199.

At 1620, the network node communicates with a user equipment (UE) via the satellite based on at least one of the SSB, the SIB, the CSI-RS, or the DM-RS. For example, FIG. 12 at 1228 shows that the base station 1204 may communicate with the UE 1202 via the satellite 1203 based on at least one of the SSB, the SIB, the CSI-RS, or the DM-RS. In an example, 1620 may be performed by the NTN component 199.

In one aspect, at 1610, the network node may receive an indication of a location of the UE while the UE is in a radio resource control (RRC) connected state, where transmitting at least one of the CSI-RS or the DM-RS for the zone within the cell may include transmitting at least one of the CSI-RS or the DM-RS for the zone within the cell based on the indication of the location of the UE. For example, FIG. 12 at 1214 shows that the base station 1204 may receive an indication of a location of the UE while the UE is in a radio resource control (RRC) connected state, where transmitting at least one of the CSI-RS or the DM-RS for the zone within the cell at 1226 may include transmitting at least one of the CSI-RS or the DM-RS for the zone within the cell based on the indication of the location of the UE. In an example, the indication of the location of the UE may be the RRC_CO-NNECTED UE location 808. In an example, 1610 may be performed by the NTN component 199.

In one aspect, at 1612, the network node may transmit, via radio resource control (RRC) signaling and while the UE is in a radio resource control (RRC) connected state, a zone configuration including a set of zone identifiers (IDs) for zones in the cell, where the set of zone IDs may include a zone identifier (ID) for the zone within the cell. For example, FIG. 12 at 1216 shows that the base station 1204 may transmit, via radio resource control (RRC) signaling and while the UE is in a radio resource control (RRC) connected state, a zone configuration including a set of zone identifiers (IDs) for zones in the cell, where the set of zone IDs may include a zone identifier (ID) for the zone within the cell. In an example, the RRC signaling may be the RRC signaling 814 and the zone configuration may be the zone configuration 816. The zone configuration 816 may include a set of zone identifiers (IDs) for zones in the cell, where the set of zone IDs may include a zone identifier (ID) for the zone within the cell. In an example, the zones may be the zones 706. In an example, 1612 may be performed by the NTN component 199.

In one aspect, at 1614, the network node may receive an indication that the UE has selected the zone ID for the zone, where transmitting at least one of the CSI-RS or the DM-RS for the zone within the cell may include transmitting at least one of the CSI-RS or the DM-RS for the zone within the cell based on the selected zone ID. For example, FIG. 12 at 1220 shows that the base station 1204 may receive an indication that the UE 1202 has selected the zone ID for the zone, where transmitting at least one of the CSI-RS or the DM-RS for the zone within the cell at 1226 may include transmitting at least one of the CSI-RS or the DM-RS for the zone within the cell based on the selected zone ID. In an example, the zone ID may be or include the serving zone ID 822. In an example, 1614 may be performed by the NTN component 199.

In one aspect, the zone configuration may further include at least one of a two-dimensional (2D) geofencing boundary for the zone or a three-dimensional (3D) geofencing boundary for the zone. For example, the zone configuration may be the zone configuration 816 and at least one of the 2D geofencing boundary for the zone or the 3D geofencing boundary for the zone may be included in the zone geofencing information 818.

In one aspect, the zone configuration may further indicate a central location of the zone. For example, the zone configuration may be the zone configuration 816 and the indication of the central location of the zone may be included in the center zone location information 820.

In one aspect, the SIB for the cell may include a zone configuration including a set of zone identifiers (IDs) for zones in the cell, where the set of zone IDs may include a zone identifier (ID) for the zone within the cell, and at 1616, the network node may receive, during initial cell access of the cell by the UE, an indication that the UE has selected the zone ID for the zone, and where transmitting at least one of the CSI-RS or the DM-RS for the zone within the cell may include transmitting at least one of the CSI-RS or the DM-RS for the zone within the cell based on the selected zone ID. In an example, the SIB may be the SIB 906 which may include a set of zone IDs for zones in the cell. In an example, the zones may be the zones 706. In an example, FIG. 12 at 1224 shows that the base station 1204 may receive, during initial cell access of the cell by the UE 1202, an indication that the UE 1202 has selected the zone ID for the zone, and where transmitting at least one of the CSI-RS or the DM-RS for the zone within the cell at 1226 may include transmitting at least one of the CSI-RS or the DM-RS for the zone within the cell based on the selected zone ID. In an example, the selected zone ID may be the serving zone ID 918. In an example, 1616 may be performed by the NTN component 199.

In one aspect, the SIB may configure a cell-specific physical random-access channel (PRACH), and receiving the indication that the UE has selected the zone ID for the zone may include receiving the indication of that the UE has selected the zone ID in a message A (msgA) or a message 3 (msg3) associated with the cell-specific PRACH. For example, the SIB 906 may configure a cell-specific PRACH (i.e., cell-specific PRACH resources), and receiving the indication that the UE 1202 has selected the zone ID for the zone at 1224 may include receiving the indication that the UE 1202 has selected the zone ID in a message A (msgA) or a message 3 (msg3) associated with the cell-specific PRACH.

In one aspect, the SIB may configure zone-specific physical random-access channel (PRACH) resources for the zone, and receiving the indication that the UE has selected the zone ID for the zone may include receiving the indication that the UE has selected the zone ID for the zone in the zone-specific PRACH resources for the zone. For example, the SIB 906 may configure the zone-specific PRACH resources 922, and receiving the indication that the UE 1202 has selected the zone ID for the zone at 1224 may include receiving the indication that the UE 1202 has selected the zone ID for the zone in the zone-specific PRACH resources for the zone.

In one aspect, the first beam and the second beam may be time division multiplexed or frequency division multiplexed. For example, the aforementioned aspect may correspond to the TDMed beams 1010 or the FDMed beams 1004.

In one aspect, the first beam and the second beam may be time division multiplexed, and at 1606, the network node may power boost at least one of the SSB or the SIB, and where transmitting at least one of the SSB or the SIB may include transmitting at least one of the power boosted SSB or the power boosted SIB. For example, the first beam and the second beam may correspond to the TDMed beams 1010, and FIG. 12 at 1210 shows that the base station 1204 may power boost at least one of the SSB or the SIB, and transmitting at least one of the SSB or the SIB at 1212 may include transmitting at least one of the power boosted SSB or the power boosted SIB. In an example, 1606 may be performed by the NTN component 199.

In one aspect, the SSB may be associated with a first time slot, where a second time slot may indicate (1) a first energy per resource element (EPRE) value for the SSB when the SSB is power boosted or (2) a second EPRE value for the SSB when the SSB is not power boosted. For example, the aforementioned aspect may correspond to FIG. 10. For instance, the first time slot may be or include the SSB slot(s) 1012 and the second time slot may be or include the SSB EPRE slot 1014.

In one aspect, the CSI-RS may be associated with a first time slot, and where a second time slot may indicate (1) a first power offset of non-zero-power for a resource element (RE) of the CSI-RS relative to a secondary synchronization signal (SSS) RE for time division multiplexing or (2) a second power offset of the non-zero-power for the RE of the CSI-RS relative to the SSS RE for frequency division multiplexing. For example, the aforementioned aspect may correspond to FIG. 10. For instance, the first time slot may be or include the CSI-RS slot(s) 1016 and the second time slot may be or include the power offset slot 1018.

In one aspect, at 1602, the network node may receive an indication that the UE supports the first beam and the second beam, where transmitting at least one of the SSB or the SIB and transmitting at least one of the CSI-RS or the DM-RS may include transmitting at least one of the SSB or the SIB and transmitting at least one of the CSI-RS or the DM-RS based on the received indication that the UE supports the first beam and the second beam. For example, FIG. 12 at 1206 shows that the base station 1204 may receive an indication that the UE 1202 supports the first beam and the second beam, where transmitting at least one of the SSB or the SIB at 1212 and transmitting at least one of the CSI-RS or the DM-RS at 1226 may include transmitting at least one of the SSB or the SIB and transmitting at least one of the CSI-RS or the DM-RS based on the received indication that the UE supports the first beam and the second beam. In another example, the aforementioned aspect may correspond to FIG. 11. In an example, 1602 may be performed by the NTN component 199.

In one aspect, the indication that the UE supports the first beam and the second beam may include a first indication that the UE supports a first band associated with the first beam and a second indication that the UE supports a second band associated with the second beam. For example, the indication that the UE supports the first beam and the second beam may or include the per band UE capability 1108, and the per band UE capability 1108 may include a first indication that the UE supports a first band associated with the first beam and a second indication that the UE supports a second band associated with the second beam.

In one aspect, at 1604, the network node may receive a physical random-access channel (PRACH) transmission during a random-access channel (RACH) procedure, where the PRACH transmission may indicate that the UE supports the first beam and the second beam. For example, FIG. 12 at 1208 shows that the base station 1204 may receive a physical random-access channel (PRACH) transmission during a random-access channel (RACH) procedure, where the PRACH transmission may indicate that the UE supports the first beam and the second beam. In an example, the aforementioned aspect may correspond to the second example 1112 in FIG. 11. In an example, 1604 may be performed by the NTN component 198.

In one aspect, transmitting at least one of the CSI-RS or the DM-RS may include transmitting at least one of the CSI-RS or the DM-RS further based on at least one of the SSB or the SIB. For example, transmitting at least one of the CSI-RS or the DM-RS at 1226 may include transmitting at least one of the CSI-RS or the DM-RS further based on at least one of the SSB or the SIB (transmitted at 1212).

Figure 17:
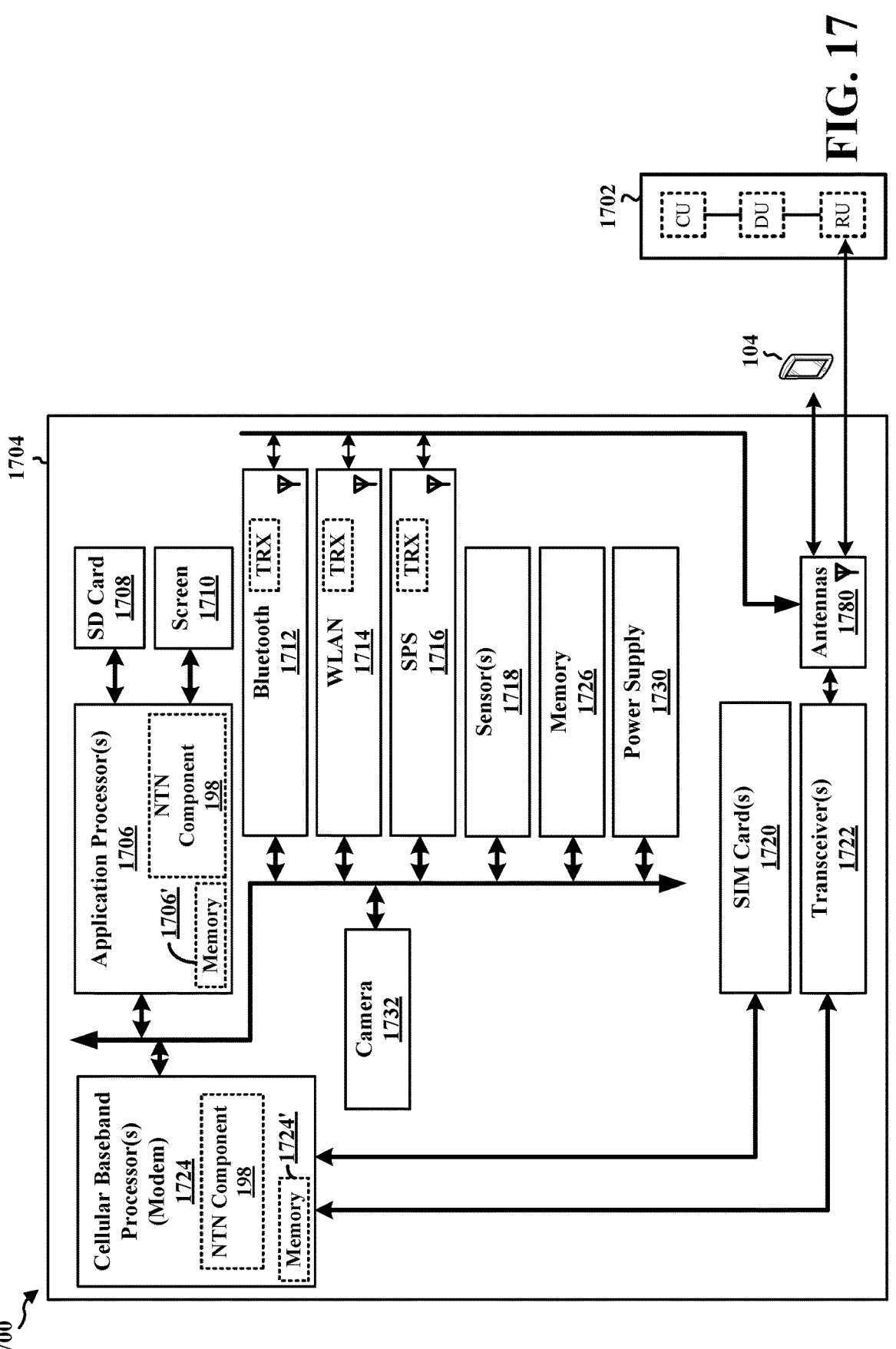
FIG. 17 is a diagram illustrating an example of a hardware implementation for an example apparatus and/or network entity.

FIG. 17 is a diagram 1700 illustrating an example of a hardware implementation for an apparatus 1704. The apparatus 1704 may be a UE, a component of a UE, or may implement UE functionality. In some aspects, the apparatus 1704 may include at least one cellular baseband processor 1724 (also referred to as a modem) coupled to one or more transceivers 1722 (e.g., cellular RF transceiver). The cellular baseband processor(s) 1724 may include at least one on-chip memory 1724'. In some aspects, the apparatus 1704 may further include one or more subscriber identity modules (SIM) cards 1720 and at least one application processor 1706 coupled to a secure digital (SD) card 1708 and a screen 1710. The application processor(s) 1706 may include on-chip memory 1706'. In some aspects, the apparatus 1704 may further include a Bluetooth module 1712, a WLAN module 1714, an SPS module 1716 (e.g., GNSS module), one or more sensor modules 1718 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1726, a power supply 1730, and/or a camera 1732. The Bluetooth module 1712, the WLAN module 1714, and the SPS module 1716 may include an on-chip transceiver (TRX) (or in some cases, just a receiver (RX)). The Bluetooth module 1712, the WLAN module 1714, and the SPS module 1716 may include their own dedicated antennas and/or utilize the antennas 1780 for communication. The cellular baseband processor(s) 1724 communicates through the transceiver(s) 1722 via one or more antennas 1780 with the UE 104 and/or with an RU associated with a network entity 1702. The cellular baseband processor(s) 1724 and the application processor(s) 1706 may each include a computer-readable medium/memory 1724', 1706', respectively. The additional memory modules 1726 may also be considered a computer-readable medium/memory. Each computer-readable medium/memory 1724', 1706', 1726 may be non-transitory. The cellular baseband processor(s) 1724 and the application processor(s) 1706 are each responsible for general processing, including the execution of software stored on the computer-readable medium/memory. The software, when executed by the cellular baseband processor(s) 1724/application processor(s) 1706, causes the cellular baseband processor(s) 1724/application processor(s) 1706 to perform the various functions described supra. The computer-readable medium/memory may also be used for storing data that is manipulated by the cellular baseband processor(s) 1724/application processor(s) 1706 when executing software. The cellular baseband processor(s) 1724/application processor(s) 1706 may be a component of the UE 350 and may include the at least one memory 360 and/or at least one of the TX processor 368, the RX processor 356, and the controller/processor 359. In one configuration, the apparatus 1704 may be at least one processor chip (modem and/or application) and include just the cellular baseband processor(s) 1724 and/or the application processor(s) 1706, and in another configuration, the apparatus 1704 may be the entire UE (e.g., see UE 350 of FIG. 3) and include the additional modules of the apparatus 1704.

As discussed supra, the NTN component 198 may be configured to receive, via a satellite and over a first bandwidth and a first beam, at least one of a synchronization signal block (SSB) or a system information block (SIB) for a cell. The NTN component 198 may be configured to receive, via the satellite and over a second bandwidth and a second beam, at least one of a channel-state information reference signal (CSI-RS) or a demodulation reference signal (DM-RS) for data transmission for a zone within the cell, where the first bandwidth is less than the second bandwidth, and where a first width of the first beam is greater than a second width of the second beam. The NTN component 198 may be configured to communicate via the satellite based on at least one of the SSB, the SIB, the CSI-RS, or the DM-RS. The NTN component 198 may be configured to transmit, for a network node, an indication of a location of the UE while the UE is in a radio resource control (RRC) connected state, where receiving at least one of the CSI-RS or the DM-RS for the zone within the cell includes receiving at least one of the CSI-RS or the DM-RS for the zone within the cell based on the indication of the location of the UE. The NTN component 198 may be configured to receive, via radio resource control (RRC) signaling and while the UE is in a radio resource control (RRC) connected state, a zone configuration including a set of zone identifiers (IDs) for zones in the cell, where the set of zone IDs includes a zone identifier (ID) for the zone within the cell. The NTN component 198 may be configured to select the zone ID for the zone based on a location of the UE. The NTN component 198 may be configured to transmit, for a network node, an indication of the selected zone ID, and where receiving at least one of the CSI-RS or the DM-RS for the zone within the cell includes receiving at least one of the CSI-RS or the DM-RS for the zone within the cell based on the selected zone ID. The NTN component 198 may be configured to select, while the UE is in a radio resource control (RRC) idle state or while the UE is in an RRC inactive state, the zone ID for the zone based on a location of the UE. The NTN component 198 may be configured to transmit, during initial cell access of the cell, an indication of the selected zone ID, and where receiving at least one of the CSI-RS or the DM-RS for the zone within the cell includes receiving at least one of the CSI-RS or the DM-RS for the zone within the cell based on the selected zone ID. The NTN component 198 may be configured to transmit, for a network node, an indication that the UE supports the first beam and the second beam, where receiving at least one of the SSB or the SIB and receiving at least one of the CSI-RS or the DM-RS include receiving at least one of the SSB or the SIB and receiving at least one of the CSI-RS or the DM-RS based on the transmitted indication that the UE supports the first beam and the second beam. The NTN component 198 may be configured to transmit a physical random-access channel (PRACH) transmission during a random-access channel (RACH) procedure, where the PRACH transmission indicates that the UE supports the first beam and the second beam. The NTN component 198 may be within the cellular baseband processor(s) 1724, the application processor(s) 1706, or both the cellular baseband processor(s) 1724 and the application processor(s) 1706. The NTN component 198 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. As shown, the apparatus 1704 may include a variety of components configured for various functions. In one configuration, the apparatus 1704, and in particular the cellular baseband processor(s) 1724 and/or the application processor(s) 1706, may include means for receiving, via a satellite and over a first bandwidth and a first beam, at least one of a synchronization signal block (SSB) or a system information block (SIB) for a cell. In one configuration, the apparatus 1704, and in particular the cellular baseband processor(s) 1724 and/or the application processor(s) 1706, may include means for receiving, via the satellite and over a second bandwidth and a second beam, at least one of a channel-state information reference signal (CSI-RS) or a demodulation reference signal (DM-RS) for data transmission for a zone within the cell, where the first bandwidth is less than the second bandwidth, and where a first width of the first beam is greater than a second width of the second beam. In one configuration, the apparatus 1704, and in particular the cellular baseband processor(s) 1724 and/or the application processor(s) 1706, may include means for communicating via the satellite based on at least one of the SSB, the SIB, the CSI-RS, or the DM-RS. In one configuration, the apparatus 1704, and in particular the cellular baseband processor(s) 1724 and/or the application processor(s) 1706, may include means for transmitting, for a network node, an indication of a location of the UE while the UE is in a radio resource control (RRC) connected state, where receiving at least one of the CSI-RS or the DM-RS for the zone within the cell includes receiving at least one of the CSI-RS or the DM-RS for the zone within the cell based on the indication of the location of the UE. In one configuration, the apparatus 1704, and in particular the cellular baseband processor(s) 1724 and/or the application processor(s) 1706, may include means for receiving, via radio resource control (RRC) signaling and while the UE is in a radio resource control (RRC) connected state, a zone configuration including a set of zone identifiers (IDs) for zones in the cell, where the set of zone IDs includes a zone identifier (ID) for the zone within the cell. In one configuration, the apparatus 1704, and in particular the cellular baseband processor(s) 1724 and/or the application processor(s) 1706, may include means for selecting the zone ID for the zone based on a location of the UE. In one configuration, the apparatus 1704, and in particular the cellular baseband processor(s) 1724 and/or the application processor(s) 1706, may include means for transmitting, for a network node, an indication of the selected zone ID, and where receiving at least one of the CSI-RS or the DM-RS for the zone within the cell includes receiving at least one of the CSI-RS or the DM-RS for the zone within the cell based on the selected zone ID. In one configuration, the apparatus 1704, and in particular the cellular baseband processor(s) 1724 and/or the application processor(s) 1706, may include means for selecting, while the UE is in a radio resource control (RRC) idle state or while the UE is in an RRC inactive state, the zone ID for the zone based on a location of the UE. In one configuration, the apparatus 1704, and in particular the cellular baseband processor(s) 1724 and/or the application processor(s) 1706, may include means for transmitting, during initial cell access of the cell, an indication of the selected zone ID, and where receiving at least one of the CSI-RS or the DM-RS for the zone within the cell includes receiving at least one of the CSI-RS or the DM-RS for the zone within the cell based on the selected zone ID. In one configuration, the apparatus 1704, and in particular the cellular baseband processor(s) 1724 and/or the application processor(s) 1706, may include means for transmitting, for a network node, an indication that the UE supports the first beam and the second beam, where receiving at least one of the SSB or the SIB and receiving at least one of the CSI-RS or the DM-RS include receiving at least one of the SSB or the SIB and receiving at least one of the CSI-RS or the DM-RS based on the transmitted indication that the UE supports the first beam and the second beam. In one configuration, the apparatus 1704, and in particular the cellular baseband processor(s) 1724 and/or the application processor(s) 1706, may include means for transmitting a physical random-access channel (PRACH) transmission during a random-access channel (RACH) procedure, where the PRACH transmission indicates that the UE supports the first beam and the second beam. The means may be the NTN component 198 of the apparatus 1704 configured to perform the functions recited by the means. As described supra, the apparatus 1704 may include the TX processor 368, the RX processor 356, and the controller/processor 359. As such, in one configuration, the means may be the TX processor 368, the RX processor 356, and/or the controller/processor 359 configured to perform the functions recited by the means.

Figure 18:
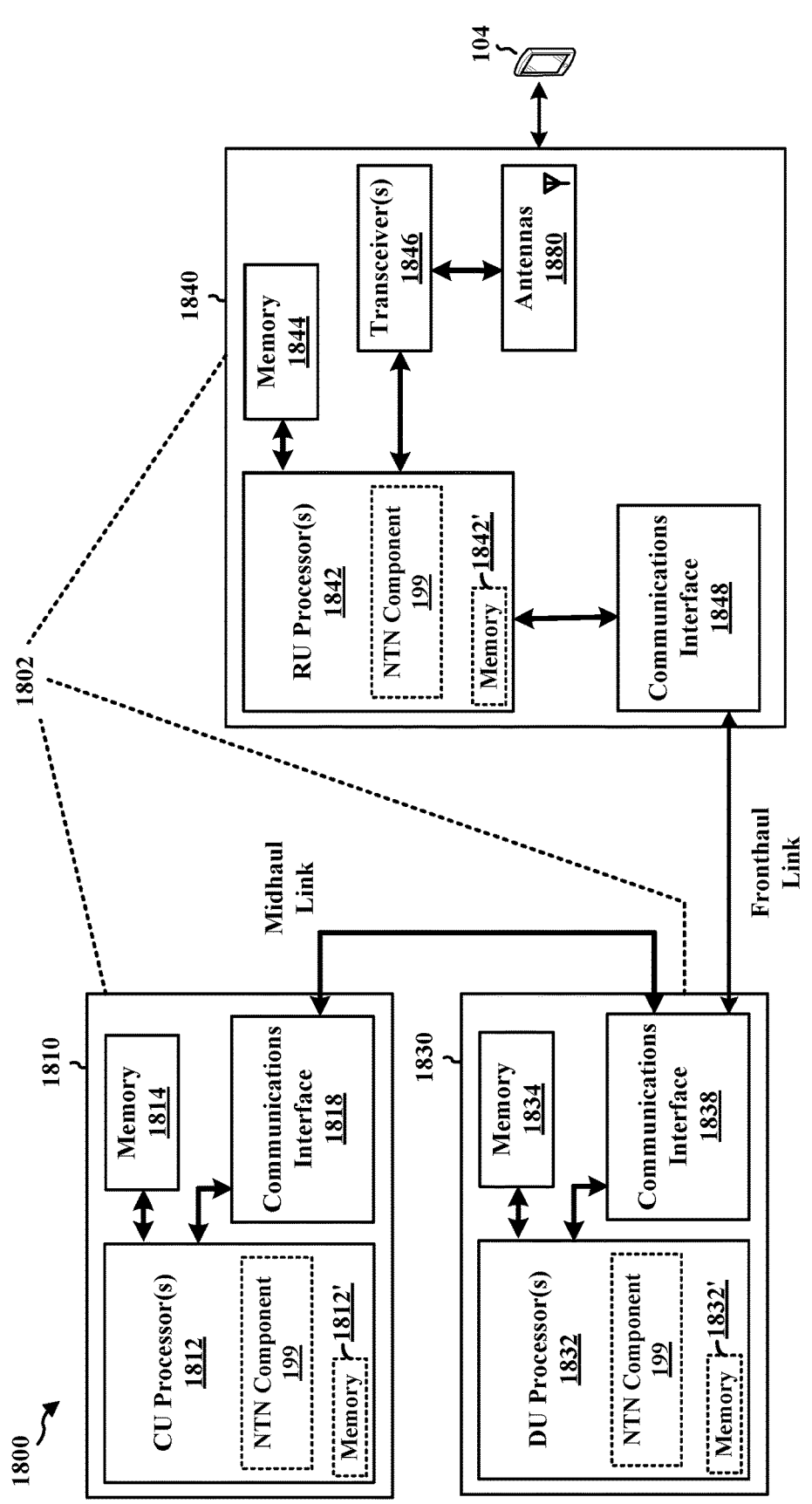
FIG. 18 is a diagram illustrating an example of a hardware implementation for an example network entity.

FIG. 18 is a diagram 1800 illustrating an example of a hardware implementation for a network entity 1802. The network entity 1802 may be a BS, a component of a BS, or may implement BS functionality. The network entity 1802 may include at least one of a CU 1810, a DU 1830, or an RU 1840. For example, depending on the layer functionality handled by the NTN component 199, the network entity 1802 may include the CU 1810; both the CU 1810 and the DU 1830; each of the CU 1810, the DU 1830, and the RU 1840; the DU 1830; both the DU 1830 and the RU 1840; or the RU 1840. The CU 1810 may include at least one CU processor 1812. The CU processor(s) 1812 may include on-chip memory 1812'. In some aspects, the CU 1810 may further include additional memory modules 1814 and a communications interface 1818. The CU 1810 communicates with the DU 1830 through a midhaul link, such as an F1 interface. The DU 1830 may include at least one DU processor 1832. The DU processor(s) 1832 may include on-chip memory 1832'. In some aspects, the DU 1830 may further include additional memory modules 1834 and a communications interface 1838. The DU 1830 communicates with the RU 1840 through a fronthaul link. The RU 1840 may include at least one RU processor 1842. The RU processor(s) 1842 may include on-chip memory 1842'. In some aspects, the RU 1840 may further include additional memory modules 1844, one or more transceivers 1846, antennas 1880, and a communications interface 1848. The RU 1840 communicates with the UE 104. The on-chip memory 1812', 1832', 1842' and the additional memory modules 1814, 1834, 1844 may each be considered a computer-readable medium/memory. Each computer-readable medium/memory may be non-transitory. Each of the processors 1812, 1832, 1842 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the NTN component 199 may be configured to transmit, via a satellite, at least one of a synchronization signal block (SSB) or a system information block (SIB) for a cell, where at least one of the SSB or the SIB is associated with a first bandwidth and a first beam. The NTN component 199 may be configured to transmit, via the satellite, at least one of a channel-state information reference signal (CSI-RS) or a demodulation reference signal (DM-RS) for data transmission for a zone within the cell, where at least one of the CSI-RS or the DM-RS is associated with a second bandwidth and a second beam, where the first bandwidth is less than the second bandwidth, and where a first width of the first beam is greater than a second width of the second beam. The NTN component 199 may be configured to communicate with a user equipment (UE) via the satellite based on at least one of the SSB, the SIB, the CSI-RS, or the DM-RS. The NTN component 199 may be configured to receive an indication of a location of the UE while the UE is in a radio resource control (RRC) connected state, where transmitting at least one of the CSI-RS or the DM-RS for the zone within the cell includes transmitting at least one of the CSI-RS or the DM-RS for the zone within the cell based on the indication of the location of the UE. The NTN component 199 may be configured to transmit, via radio resource control (RRC) signaling and while the UE is in a radio resource control (RRC) connected state, a zone configuration including a set of zone identifiers (IDs) for zones in the cell, where the set of zone IDs includes a zone identifier (ID) for the zone within the cell. The NTN component 199 may be configured to receive, an indication that the UE has selected the zone ID for the zone, where transmitting at least one of the CSI-RS or the DM-RS for the zone within the cell includes transmitting at least one of the CSI-RS or the DM-RS for the zone within the cell based on the selected zone ID. The NTN component 199 may be configured to receive, during initial cell access of the cell by the UE, an indication that the UE has selected the zone ID for the zone, and where transmitting at least one of the CSI-RS or the DM-RS for the zone within the cell includes transmitting at least one of the CSI-RS or the DM-RS for the zone within the cell based on the selected zone ID. The NTN component 199 may be configured to power boost at least one of the SSB or the SIB, and where transmitting at least one of the SSB or the SIB includes transmitting at least one of the power boosted SSB or the power boosted SIB. The NTN component 199 may be configured to receive an indication that the UE supports the first beam and the second beam, where transmitting at least one of the SSB or the SIB and transmitting at least one of the CSI-RS or the DM-RS include transmitting at least one of the SSB or the SIB and transmitting at least one of the CSI-RS or the DM-RS based on the received indication that the UE supports the first beam and the second beam. The NTN component 199 may be configured to receive a physical random-access channel (PRACH) transmission during a random-access channel (RACH) procedure, where the PRACH transmission indicates that the UE supports the first beam and the second beam. The NTN component 199 may be within one or more processors of one or more of the CU 1810, DU 1830, and the RU 1840. The NTN component 199 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. The network entity 1802 may include a variety of components configured for various functions. In one configuration, the network entity 1802 may include means for transmitting, via a satellite, at least one of a synchronization signal block (SSB) or a system information block (SIB) for a cell, where at least one of the SSB or the SIB is associated with a first bandwidth and a first beam. In one configuration, the network entity 1802 may include means for transmitting, via the satellite, at least one of a channel-state information reference signal (CSI-RS) or a demodulation reference signal (DM-RS) for data transmission for a zone within the cell, where at least one of the CSI-RS or the DM-RS is associated with a second bandwidth and a second beam, where the first bandwidth is less than the second bandwidth, and where a first width of the first beam is greater than a second width of the second beam. In one configuration, the network entity 1802 may include means for communicating with a user equipment (UE) via the satellite based on at least one of the SSB, the SIB, the CSI-RS, or the DM-RS. In one configuration, the network entity 1802 may include means for receiving an indication of a location of the UE while the UE is in a radio resource control (RRC) connected state, where transmitting at least one of the CSI-RS or the DM-RS for the zone within the cell includes transmitting at least one of the CSI-RS or the DM-RS for the zone within the cell based on the indication of the location of the UE. In one configuration, the network entity 1802 may include means for transmitting, via radio resource control (RRC) signaling and while the UE is in a radio resource control (RRC) connected state, a zone configuration including a set of zone identifiers (IDs) for zones in the cell, where the set of zone IDs includes a zone identifier (ID) for the zone within the cell. In one configuration, the network entity 1802 may include means for receiving, an indication that the UE has selected the zone ID for the zone, where transmitting at least one of the CSI-RS or the DM-RS for the zone within the cell includes transmitting at least one of the CSI-RS or the DM-RS for the zone within the cell based on the selected zone ID. In one configuration, the network entity 1802 may include means for receiving, during initial cell access of the cell by the UE, an indication that the UE has selected the zone ID for the zone, and where transmitting at least one of the CSI-RS or the DM-RS for the zone within the cell includes transmitting at least one of the CSI-RS or the DM-RS for the zone within the cell based on the selected zone ID. In one configuration, the network entity 1802 may include means for power boosting at least one of the SSB or the SIB, and where transmitting at least one of the SSB or the SIB includes transmitting at least one of the power boosted SSB or the power boosted SIB. In one configuration, the network entity 1802 may include means for receiving an indication that the UE supports the first beam and the second beam, where transmitting at least one of the SSB or the SIB and transmitting at least one of the CSI-RS or the DM-RS include transmitting at least one of the SSB or the SIB and transmitting at least one of the CSI-RS or the DM-RS based on the received indication that the UE supports the first beam and the second beam. In one configuration, the network entity 1802 may include means for receiving a physical random-access channel (PRACH) transmission during a random-access channel (RACH) procedure, where the PRACH transmission indicates that the UE supports the first beam and the second beam. The means may be the NTN component 199 of the network entity 1802 configured to perform the functions recited by the means. As described supra, the network entity 1802 may include the TX processor 316, the RX processor 370, and the controller/processor 375. As such, in one configuration, the means may be the TX processor 316, the RX processor 370, and/or the controller/processor 375 configured to perform the functions recited by the means. A non-terrestrial network (NTN) may refer to a wireless communication system that utilizes satellites in order to provide wireless communication services to UEs. In an example, a UE may transmit first data and/or first signal(s) to a satellite via a service link and the satellite may relay the first data and/or the first signal(s) to a network node (e.g., a base station) via a feeder link. In another example, the network node may transmit second data and/or second signal(s) to the satellite via the feeder link and the satellite may relay the second data and/or the second signal(s) to the UE via the service link.

In a 5G NR NTN, a satellite may divide a service area into sub-areas (i.e., cells) and serve each of the sub-areas with individual beams, where each of the individual beams may correspond to one cell. In order to avoid inter-cell beam interference, the satellite may apply different frequency bands (frequency reuse factor>1) to neighboring cells. However, if frequency bands are reused, subbands allocated per cell/SSB beam may have limited spectrum resources for data transmission.

Beam hopping may refer to a satellite communication technology that increases network capacity by using different beams in a time division multiplexing (TDM) manner. In an example with respect to beam hopping, each cell may have a cell-specific beam for initial access and data. Data for cells/beams that are located relatively far away from one another may be transmitted in the same time slot and may use a whole bandwidth, whereas data for adjacent cells/beams may be transmitted in different time slots. A beam hopping time pattern may determine a cell dwell time within a cluster of cells. However, if beam hopping is utilized, a time allocated per cell beam may have limited time resources both for initial cell access and data transmission. Thus, both frequency reuse and beam hopping may have limited resource utilization and/or may not be able to support flexible resource allocation based on whether or not a UE is present in a coverage area.

Various technologies pertaining to resource allocation for an NTN with beam hopping are described herein. In an example, a UE receives, via a satellite and over a first bandwidth and a first beam, at least one of a synchronization signal block (SSB) or a system information block (SIB) for a cell. The UE receives, via the satellite and over a second bandwidth and a second beam, at least one of a channel-state information reference signal (CSI-RS) or a demodulation reference signal (DM-RS) for data transmission for a zone within the cell, where the first bandwidth is less than the second bandwidth, and where a first width of the first beam is greater than a second width of the second beam. The UE communicates via the satellite based on at least one of the SSB, the SIB, the CSI-RS, or the DM-RS. Vis-à-vis receiving at least one of the SSB and/or the SIB for the cell via the satellite and receiving at least one of the CSI-RS or the DM-RS for the zone within the cell, the UE may improve utilization of time and frequency resources. Furthermore, the SSB and/or the SIB and the CSI-RS and/or the DM-RS may facilitate flexible resource allocation based on whether or not a UE is present in a coverage area.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. When at least one processor is configured to perform a set of functions, the at least one processor, individually or in any combination, is configured to perform the set of functions. Accordingly, each processor of the at least one processor may be configured to perform a particular subset of the set of functions, where the subset is the full set, a proper subset of the set, or an empty subset of the set. A processor may be referred to as processor circuitry. A memory/memory module may be referred to as memory circuitry. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 a method of wireless communication at a user equipment (UE), including: receiving, via a satellite and over a first bandwidth and a first beam, at least one of a synchronization signal block (SSB) or a system information block (SIB) for a cell; receiving, via the satellite and over a second bandwidth and a second beam, at least one of a channel-state information reference signal (CSI-RS) or a demodulation reference signal (DM-RS) for data transmission for a zone within the cell, where the first bandwidth is less than the second bandwidth, and where a first width of the first beam is greater than a second width of the second beam; and communicating via the satellite based on at least one of the SSB, the SIB, the CSI-RS, or the DM-RS.

Aspect 2 is the method of aspect 1, where receiving at least one of the CSI-RS or the DM-RS for the zone within the cell includes receiving at least one of the CSI-RS or the DM-RS for the zone within the cell when the UE is in the zone over the second beam, and where the second beam is directed towards the zone.

Aspect 3 is the method of any of aspects 1-2, further including: transmitting, for a network node, an indication of a location of the UE while the UE is in a radio resource control (RRC) connected state, where receiving at least one of the CSI-RS or the DM-RS for the zone within the cell includes receiving at least one of the CSI-RS or the DM-RS for the zone within the cell based on the indication of the location of the UE.

Aspect 4 is the method of any of aspects 1-2, further including: receiving, via radio resource control (RRC) signaling and while the UE is in a radio resource control (RRC) connected state, a zone configuration including a set of zone identifiers (IDs) for zones in the cell, where the set of zone IDs includes a zone identifier (ID) for the zone within the cell; selecting the zone ID for the zone based on a location of the UE; and transmitting, for a network node, an indication of the selected zone ID, and where receiving at least one of the CSI-RS or the DM-RS for the zone within the cell includes receiving at least one of the CSI-RS or the DM-RS for the zone within the cell based on the selected zone ID.

Aspect 5 is the method of aspect 4, where the zone configuration further includes at least one of a two-dimensional (2D) geofencing boundary for the zone or a three-dimensional (3D) geofencing boundary for the zone, and where selecting the zone ID for the zone includes selecting the zone ID for the zone based on the location of the UE being within at least one of the 2D geofencing boundary for the zone or the 3D geofencing boundary for the zone.

Aspect 6 is the method of aspect 4, where the zone configuration further indicates a central location of the zone, and where selecting the zone ID for the zone includes selecting the zone ID for the zone based on a distance of the UE from the central location of the zone.

Aspect 7 is the method of any of aspects 1-2, where the SIB for the cell includes a zone configuration including a set of zone identifiers (IDs) for zones in the cell, where the set of zone IDs includes a zone identifier (ID) for the zone within the cell, the method further including: selecting, while the UE is in a radio resource control (RRC) idle state or while the UE is in an RRC inactive state, the zone ID for the zone based on a location of the UE; and transmitting, during initial cell access of the cell, an indication of the selected zone ID, and where receiving at least one of the CSI-RS or the DM-RS for the zone within the cell includes receiving at least one of the CSI-RS or the DM-RS for the zone within the cell based on the selected zone ID.

Aspect 8 is the method of aspect 7, where the zone configuration further includes at least one of a two-dimensional (2D) geofencing boundary for the zone or a three-dimensional (3D) geofencing boundary for the zone, and where selecting the zone ID for the zone while the UE is in the RRC idle state or while the UE is in the RRC inactive state includes selecting the zone ID for the zone based on the location of the UE being within at least one of the 2D geofencing boundary for the zone or the 3D geofencing boundary for the zone.

Aspect 9 is the method of aspect 7, where the zone configuration further indicates a central location of the zone, and where selecting the zone ID for the zone while the UE is in the RRC idle state or while the UE is in the RRC inactive state includes selecting the zone ID for the zone based on a distance of the UE from the central location of the zone.

Aspect 10 is the method of aspect 7, where the SIB configures a cell-specific physical random-access channel (PRACH), and where transmitting the indication of the selected zone ID includes transmitting the indication of the selected zone ID in a message A (msgA) or a message 3 (msg3) associated with the cell-specific PRACH.

Aspect 11 is the method of aspect 7, where the SIB configures zone-specific physical random-access channel (PRACH) resources for the zones within the cell, and where transmitting the indication of the selected zone ID includes transmitting the PRACH in a corresponding zone-specific PRACH resource for the zone.

Aspect 12 is the method of any of aspects 1-11, where the first beam and the second beam are time division multiplexed or frequency division multiplexed.

Aspect 13 is the method of aspect 12, where at least one of the SSB or the SIB is power boosted when the first beam and the second beam are time division multiplexed.

Aspect 14 is the method of aspect 12, where the SSB is associated with a first time slot, where a second time slot indicates (1) a first energy per resource element (EPRE) value for the SSB when the SSB is power boosted or (2) a second EPRE value for the SSB when the SSB is not power boosted.

Aspect 15 is the method of any of aspects 12-14, where the CSI-RS is associated with a first time slot, and where a second time slot indicates (1) a first power offset of non-zero-power for a resource element (RE) of the CSI-RS relative to a secondary synchronization signal (SSS) RE for time division multiplexing or (2) a second power offset of the non-zero-power for the RE of the CSI-RS relative to the SSS RE for frequency division multiplexing.

Aspect 16 is the method of any of aspects 1-15, further including: transmitting, for a network node, an indication that the UE supports the first beam and the second beam, where receiving at least one of the SSB or the SIB and receiving at least one of the CSI-RS or the DM-RS include receiving at least one of the SSB or the SIB and receiving at least one of the CSI-RS or the DM-RS based on the transmitted indication that the UE supports the first beam and the second beam.

Aspect 17 is the method of aspect 16, where the indication that the UE supports the first beam and the second beam includes a first indication that the UE supports a first band associated with the first beam and a second indication that the UE supports a second band associated with the second beam.

Aspect 18 is the method of any of aspects 1-15, further including: transmitting a physical random-access channel (PRACH) transmission during a random-access channel (RACH) procedure, where the PRACH transmission indicates that the UE supports the first beam and the second beam.

Aspect 19 is the method of any of aspects 1-18, where receiving at least one of the CSI-RS or the DM-RS includes receiving at least one of the CSI-RS or the DM-RS further based on at least one of the SSB or the SIB.

Aspect 20 is an apparatus for wireless communication at a user equipment (UE) comprising at least one memory and at least one processor coupled to the at least one memory and, based at least in part on information stored in the at least one memory, the at least one processor, individually or in any combination, is configured to implement a method as in any of aspects 1-19.

Aspect 21 is the apparatus of aspect 20, further comprising at least one of a transceiver or an antenna coupled to the at least one processor, wherein to receive at least one of the SSB or the SIB, the at least one processor, individually or in any combination, is configured to receive at least one of the SSB or the SIB via at least one of the transceiver or the antenna.

Aspect 22 is an apparatus for wireless communication, further comprising means for performing a method as in any of aspects 1-19.

Aspect 23 is a computer-readable medium (e.g., a non-transitory computer-readable medium) storing computer executable code, the computer executable code, when executed by at least one processor, causes the at least one processor to implement a method as in any of aspects 1-19

Aspect 24 is a method of wireless communication at a network node, including: transmitting, via a satellite, at least one of a synchronization signal block (SSB) or a system information block (SIB) for a cell, where at least one of the SSB or the SIB is associated with a first bandwidth and a first beam; transmitting, via the satellite, at least one of a channel-state information reference signal (CSI-RS) or a demodulation reference signal (DM-RS) for data transmission for a zone within the cell, where at least one of the CSI-RS or the DM-RS is associated with a second bandwidth and a second beam, where the first bandwidth is less than the second bandwidth, and where a first width of the first beam is greater than a second width of the second beam; and communicating with a user equipment (UE) via the satellite based on at least one of the SSB, the SIB, the CSI-RS, or the DM-RS.

Aspect 25 is the method of aspect 24, further including: receiving an indication of a location of the UE while the UE is in a radio resource control (RRC) connected state, where transmitting at least one of the CSI-RS or the DM-RS for the zone within the cell includes transmitting at least one of the CSI-RS or the DM-RS for the zone within the cell based on the indication of the location of the UE.

Aspect 26 is the method of aspect 24, further including: transmitting, via radio resource control (RRC) signaling and while the UE is in a radio resource control (RRC) connected state, a zone configuration including a set of zone identifiers (IDs) for zones in the cell, where the set of zone IDs includes a zone identifier (ID) for the zone within the cell; and receiving, an indication that the UE has selected the zone ID for the zone, where transmitting at least one of the CSI-RS or the DM-RS for the zone within the cell includes transmitting at least one of the CSI-RS or the DM-RS for the zone within the cell based on the selected zone ID.

Aspect 27 is the method of aspect 26, where the zone configuration further includes at least one of a two-dimensional (2D) geofencing boundary for the zone or a three-dimensional (3D) geofencing boundary for the zone.

Aspect 28 is the method of aspect 26, where the zone configuration further indicates a central location of the zone.

Aspect 29 is the method of aspect 24, where the SIB for the cell includes a zone configuration including a set of zone identifiers (IDs) for zones in the cell, where the set of zone IDs includes a zone identifier (ID) for the zone within the cell, the method further including: receiving, during initial cell access of the cell by the UE, an indication that the UE has selected the zone ID for the zone, and where transmitting at least one of the CSI-RS or the DM-RS for the zone within the cell includes transmitting at least one of the CSI-RS or the DM-RS for the zone within the cell based on the selected zone ID.

Aspect 30 is the method of aspect 29, where the SIB configures a cell-specific physical random-access channel (PRACH), and where receiving the indication that the UE has selected the zone ID for the zone includes receiving the indication that the UE has selected the zone ID in a message A (msgA) or a message 3 (msg3) associated with the cell-specific PRACH.

Aspect 31 is the method of aspect 29, where the SIB configures zone-specific physical random-access channel (PRACH) resources for the zone, and where receiving the indication that the UE has selected the zone ID for the zone includes receiving the indication that the UE has selected the zone ID for the zone in the zone-specific PRACH resources for the zone.

Aspect 32 is the method of any of aspects 24-31, where the first beam and the second beam are time division multiplexed or frequency division multiplexed.

Aspect 33 is the method of aspect 32, where the first beam and the second beam are time division multiplexed, the method further including: power boosting at least one of the SSB or the SIB, and where transmitting at least one of the SSB or the SIB includes transmitting at least one of the power boosted SSB or the power boosted SIB.

Aspect 34 is the method of aspect 32, where the SSB is associated with a first time slot, where a second time slot indicates (1) a first energy per resource element (EPRE) value for the SSB when the SSB is power boosted or (2) a second EPRE value for the SSB when the SSB is not power boosted.

Aspect 35 is the method of any of aspects 32-24, where the CSI-RS is associated with a first time slot, and where a second time slot indicates (1) a first power offset of non-zero-power for a resource element (RE) of the CSI-RS relative to a secondary synchronization signal (SSS) RE for time division multiplexing or (2) a second power offset of the non-zero-power for the RE of the CSI-RS relative to the SSS RE for frequency division multiplexing.

Aspect 36 is the method of any of aspects 24-35, further including: receiving an indication that the UE supports the first beam and the second beam, where transmitting at least one of the SSB or the SIB and transmitting at least one of the CSI-RS or the DM-RS include transmitting at least one of the SSB or the SIB and transmitting at least one of the CSI-RS or the DM-RS based on the received indication that the UE supports the first beam and the second beam.

Aspect 37 is the method of aspect 36, where the indication that the UE supports the first beam and the second beam includes a first indication that the UE supports a first band associated with the first beam and a second indication that the UE supports a second band associated with the second beam.

Aspect 38 is the method of any of aspects 24-35, further including: receiving a physical random-access channel (PRACH) transmission during a random-access channel (RACH) procedure, where the PRACH transmission indicates that the UE supports the first beam and the second beam.

Aspect 39 is the method of any of aspects 24-38, where transmitting at least one of the CSI-RS or the DM-RS includes transmitting at least one of the CSI-RS or the DM-RS further based on at least one of the SSB or the SIB.

Aspect 40 is an apparatus for wireless communication at a user equipment (UE)/network node comprising at least one memory and at least one processor coupled to the at least one memory and, based at least in part on information stored in the at least one memory, the at least one processor, individually or in any combination, is configured to implement a method as in any of aspects 24-39.

Aspect 41 is the apparatus of aspect 40, further comprising at least one of a transceiver or an antenna coupled to the at least one processor, wherein to transmit at least one the SSB or the SIB, the at least one processor, individually or in any combination, is configured to transmit at least one of the SSB or the SIB via at least one of the transceiver or the antenna.

Aspect 42 is an apparatus for wireless communication, further comprising means for performing a method as in any of aspects 24-39.

Aspect 43 is a computer-readable medium (e.g., a non-transitory computer-readable medium) storing computer executable code, the computer executable code, when executed by at least one processor, causes the at least one processor to implement a method as in any of aspects 24-39.

What is claimed is:

1. An apparatus for wireless communication at a user equipment (UE), comprising:

at least one memory; and at least one processor coupled to the at least one memory and, based at least in part on information stored in the at least one memory, the at least one processor, individually or in any combination, is configured to:

receive, via a satellite and over a first bandwidth and a first beam, at least one of a synchronization signal block (SSB) or a system information block (SIB) for a cell;

receive, via the satellite and over a second bandwidth and a second beam, at least one of a channel-state information reference signal (CSI-RS) or a demodulation reference signal (DM-RS) for data transmission for a zone within the cell, wherein the first bandwidth is less than the second bandwidth, and wherein a first width of the first beam is greater than a second width of the second beam; and communicate via the satellite based on at least one of the SSB, the SIB, the CSI-RS, or the DM-RS.

2. The apparatus of claim 1, wherein to receive at least one of the CSI-RS or the DM-RS for the zone within the cell, the at least one processor, individually or in any combination, is configured to receive at least one of the CSI-RS or the DM-RS for the zone within the cell when the UE is in the zone over the second beam, and wherein the second beam is directed towards the zone.

3. The apparatus of claim 1, wherein the at least one processor, individually or in any combination, is further configured to:

transmit, for a network node, an indication of a location of the UE while the UE is in a radio resource control (RRC) connected state, wherein to receive at least one of the CSI-RS or the DM-RS for the zone within the cell, the at least one processor, individually or in any combination, is configured to receive at least one of the CSI-RS or the DM-RS for the zone within the cell based on the indication of the location of the UE.

4. The apparatus of claim 1, wherein the at least one processor, individually or in any combination, is further configured to:

receive, via radio resource control (RRC) signaling and while the UE is in a radio resource control (RRC) connected state, a zone configuration comprising a set of zone identifiers (IDs) for zones in the cell, wherein the set of zone IDs includes a zone identifier (ID) for the zone within the cell;

select the zone ID for the zone based on a location of the UE; and transmit, for a network node, an indication of the selected zone ID, and wherein to receive at least one of the CSI-RS or the DM-RS for the zone within the cell, the at least one processor, individually or in any combination, is configured to receive at least one of the CSI-RS or the DM-RS for the zone within the cell based on the selected zone ID.

5. The apparatus of claim 4, wherein the zone configuration further comprises at least one of a two-dimensional (2D) geofencing boundary for the zone or a three-dimensional (3D) geofencing boundary for the zone, and wherein to select the zone ID for the zone, the at least one processor, individually or in any combination, is configured to select the zone ID for the zone based on the location of the UE being within at least one of the 2D geofencing boundary for the zone or the 3D geofencing boundary for the zone.

6. The apparatus of claim 4, wherein the zone configuration further indicates a central location of the zone, and wherein to select the zone ID for the zone, the at least one processor, individually or in any combination, is configured to select the zone ID for the zone based on a distance of the UE from the central location of the zone.

7. The apparatus of claim 1, wherein the SIB for the cell comprises a zone configuration comprising a set of zone identifiers (IDs) for zones in the cell, wherein the set of zone IDs includes a zone identifier (ID) for the zone within the cell, and wherein the at least one processor, individually or in any combination, is further configured to:

select, while the UE is in a radio resource control (RRC) idle state or while the UE is in an RRC inactive state, the zone ID for the zone based on a location of the UE; and transmit, during initial cell access of the cell, an indication of the selected zone ID, and wherein to receive at least one of the CSI-RS or the DM-RS for the zone within the cell, the at least one processor, individually or in any combination, is configured to receive at least one of the CSI-RS or the DM-RS for the zone within the cell based on the selected zone ID.

8. The apparatus of claim 7, wherein the zone configuration further comprises at least one of a two-dimensional (2D) geofencing boundary for the zone or a three-dimensional (3D) geofencing boundary for the zone, and wherein to select the zone ID for the zone while the UE is in the RRC idle state or while the UE is in the RRC inactive state, the at least one processor, individually or in any combination, is configured to select the zone ID for the zone based on the location of the UE being within at least one of the 2D geofencing boundary for the zone or the 3D geofencing boundary for the zone.

9. The apparatus of claim 7, wherein the zone configuration further indicates a central location of the zone, and wherein to select the zone ID for the zone while the UE is in the RRC idle state or while the UE is in the RRC inactive state, the at least one processor, individually or in any combination, is configured to select the zone ID for the zone based on a distance of the UE from the central location of the zone.

10. The apparatus of claim 7, wherein the SIB configures a cell-specific physical random-access channel (PRACH), and wherein to transmit the indication of the selected zone ID, the at least one processor, individually or in any combination, is configured to transmit the indication of the selected zone ID in a message A (msgA) or a message 3 (msg3) associated with the cell-specific PRACH.

11. The apparatus of claim 7, wherein the SIB configures zone-specific physical random-access channel (PRACH) resources for the zones within the cell, and wherein to transmit the indication of the selected zone ID, the at least one processor, individually or in any combination, is configured to transmit a PRACH in a corresponding zone-specific PRACH resource for the zone.

12. The apparatus of claim 1, wherein the first beam and the second beam are time division multiplexed or frequency division multiplexed.

13. The apparatus of claim 12, wherein at least one of the SSB or the SIB is power boosted when the first beam and the second beam are time division multiplexed.

14. The apparatus of claim 12, wherein the SSB is associated with a first time slot, wherein a second time slot indicates (1) a first energy per resource element (EPRE) value for the SSB when the SSB is power boosted or (2) a second EPRE value for the SSB when the SSB is not power boosted.

15. The apparatus of claim 12, wherein the CSI-RS is associated with a first time slot, and wherein a second time slot indicates (1) a first power offset of non-zero-power for a resource element (RE) of the CSI-RS relative to a secondary synchronization signal (SSS) RE for time division multiplexing or (2) a second power offset of the non-zero-power for the RE of the CSI-RS relative to the SSS RE for frequency division multiplexing.

16. The apparatus of claim 1, wherein the at least one processor, individually or in any combination, is further configured to:

transmit, for a network node, an indication that the UE supports the first beam and the second beam, wherein to receive at least one of the SSB or the SIB and to receive at least one of the CSI-RS or the DM-RS, the at least one processor, individually or in any combination, is configured to receive at least one of the SSB or the SIB and to receive at least one of the CSI-RS or the DM-RS based on the transmitted indication that the UE supports the first beam and the second beam.

17. The apparatus of claim 16, wherein the indication that the UE supports the first beam and the second beam comprises a first indication that the UE supports a first band associated with the first beam and a second indication that the UE supports a second band associated with the second beam.

18. The apparatus of claim 1, wherein the at least one processor, individually or in any combination, is further configured to:

transmit a physical random-access channel (PRACH) transmission during a random-access channel (RACH) procedure, wherein the PRACH transmission indicates that the UE supports the first beam and the second beam.

19. The apparatus of claim 1, wherein to receive at least one of the CSI-RS or the DM-RS, the at least one processor, individually or in any combination, is configured to receive at least one of the CSI-RS or the DM-RS further based on at least one of the SSB or the SIB.

20. The apparatus of claim 1, further comprising at least one of a transceiver or an antenna coupled to the at least one processor, wherein to receive at least one of the SSB or the SIB, the at least one processor, individually or in any combination, is configured to receive at least one of the SSB or the SIB via at least one of the transceiver or the antenna.

21. An apparatus for wireless communication at a network node, comprising:
    at least one memory; and
    at least one processor coupled to the at least one memory and, based at least in part on information stored in the at least one memory, the at least one processor, individually or in any combination, is configured to:
        transmit, via a satellite, at least one of a synchronization signal block (SSB) or a system information block (SIB) for a cell, wherein at least one of the SSB or the SIB is associated with a first bandwidth and a first beam;
        transmit, via the satellite, at least one of a channel-state information reference signal (CSI-RS) or a demodulation reference signal (DM-RS) for data transmission for a zone within the cell, wherein at least one of the CSI-RS or the DM-RS is associated with a second bandwidth and a second beam, wherein the first bandwidth is less than the second bandwidth, and wherein a first width of the first beam is greater than a second width of the second beam; and
        communicate with a user equipment (UE) via the satellite based on at least one of the SSB, the SIB, the CSI-RS, or the DM-RS.

22. The apparatus of claim 21, wherein the at least one processor, individually or in any combination, is further configured to:
    receive an indication of a location of the UE while the UE is in a radio resource control (RRC) connected state, wherein to transmit at least one of the CSI-RS or the DM-RS for the zone within the cell, wherein to transmit at least one of the CSI-RS or the DM-RS for the zone within the cell, the at least one processor, individually or in any combination, is configured to transmit at least one of the CSI-RS or the DM-RS based on the indication of the location of the UE.

23. The apparatus of claim 21, wherein the at least one processor, individually or in any combination, is further configured to:
    transmit, via radio resource control (RRC) signaling and while the UE is in a radio resource control (RRC) connected state, a zone configuration comprising a set of zone identifiers (IDs) for zones in the cell, wherein the set of zone IDs includes a zone identifier (ID) for the zone within the cell; and
    receive, an indication that the UE has selected the zone ID for the zone, wherein to transmit at least one of the CSI-RS or the DM-RS for the zone within the cell, the at least one processor, individually or in any combination, is configured to transmit at least one of the CSI-RS or the DM-RS for the zone within the cell based on the selected zone ID.

24. The apparatus of claim 23, wherein the zone configuration further comprises at least one of a two-dimensional (2D) geofencing boundary for the zone or a three-dimensional (3D) geofencing boundary for the zone.

25. The apparatus of claim 23, wherein the zone configuration further indicates a central location of the zone.

26. The apparatus of claim 21, wherein the SIB for the cell comprises a zone configuration comprising a set of zone identifiers (IDs) for zones in the cell, wherein the set of zone IDs includes a zone identifier (ID) for the zone within the cell, wherein the at least one processor, individually or in any combination, is further configured to:
    receive, during initial cell access of the cell by the UE, an indication that the UE has selected the zone ID for the zone, and wherein to transmit at least one of the CSI-RS or the DM-RS for the zone within the cell, the at least one processor, individually or in any combination, is configured to transmit at least one of the CSI-RS or the DM-RS for the zone within the cell based on the selected zone ID.

27. The apparatus of claim 26, wherein the SIB configures a cell-specific physical random-access channel (PRACH), and wherein to receive the indication that the UE has selected the zone ID for the zone, the at least one processor, individually or in any combination, is configured to receive the indication that the UE has selected the zone ID in a message A (msgA) or a message 3 (msg3) associated with the cell-specific PRACH.

28. The apparatus of claim 21, further comprising at least one of a transceiver or an antenna coupled to the at least one processor, wherein to transmit at least one of the SSB or the SIB, the at least one processor, individually or in any combination, is configured to transmit at least one of the SSB or the SIB via at least one of the transceiver or the antenna.

29. A method of wireless communication at a user equipment (UE), comprising:
    receiving, via a satellite and over a first bandwidth and a first beam, at least one of a synchronization signal block (SSB) or a system information block (SIB) for a cell;
    receiving, via the satellite and over a second bandwidth and a second beam, at least one of a channel-state information reference signal (CSI-RS) or a demodulation reference signal (DM-RS) for data transmission for a zone within the cell, wherein the first bandwidth is less than the second bandwidth, and wherein a first width of the first beam is greater than a second width of the second beam; and
    communicating via the satellite based on at least one of the SSB, the SIB, the CSI-RS, or the DM-RS.

30. A method of wireless communication at a network node, comprising:
    transmitting, via a satellite, at least one of a synchronization signal block (SSB) or a system information block (SIB) for a cell, wherein at least one of the SSB or the SIB is associated with a first bandwidth and a first beam;
    transmitting, via the satellite, at least one of a channel-state information reference signal (CSI-RS) or a demodulation reference signal (DM-RS) for data transmission for a zone within the cell, wherein at least one of the CSI-RS or the DM-RS is associated with a second bandwidth and a second beam, wherein the first bandwidth is less than the second bandwidth, and wherein a first width of the first beam is greater than a second width of the second beam; and communicating with a user equipment (UE) via the satellite based on at least one of the SSB, the SIB, the CSI-RS, or the DM-RS.

* * * * *